US012694543B2

(12) United States Patent
Li et al.

(10) Patent No.: US 12,694,543 B2
(45) Date of Patent: Jul. 28, 2026

(54) METHOD AND APPARATUS FOR REGISTERING EXTRAVASCULAR IMAGE WITH INTRAVASCULAR IMAGE, AND COMPUTING DEVICE

(71) Applicant: SUZHOU PULSE RONGYING MEDICAL TECHNOLOGY CO., LTD, Suzhou (CN)

(72) Inventors: Yingguang Li, Kunshan City (CN); Hui Qin, Kunshan City (CN); Shengxian Tu, Kunshan City (CN)

(73) Assignee: SUZHOU PULSE RONGYING MEDICAL TECHNOLOGY CO., LTD, Suzhou (CN)

( * ) Notice: Subject to any disclaimer, the term of this patent is extended or adjusted under 35 U.S.C. 154(b) by 420 days.

(21) Appl. No.: 18/038,640

(22) PCT Filed: Oct. 28, 2021

(86) PCT No.: PCT/CN2021/127049
§ 371 (c)(1),
(2) Date: May 24, 2023

(87) PCT Pub. No.: WO2022/121546
PCT Pub. Date: Jun. 16, 2022

(65) Prior Publication Data
US 2024/0013413 A1      Jan. 11, 2024

(30) Foreign Application Priority Data
Dec. 7, 2020      (CN) ........................ 202011418428.X

(51) Int. Cl.
G06T 9/00          (2006.01)
G06T 7/13          (2017.01)
(Continued)

(52) U.S. Cl.
CPC ................ G06T 7/337 (2017.01); G06T 7/13 (2017.01); G06T 7/62 (2017.01);
(Continued)

(58) Field of Classification Search
CPC .. G06T 7/337; G06T 7/13; G06T 7/62; G06T 2207/10101; G06T 2207/10132;
(Continued)

(56) References Cited

U.S. PATENT DOCUMENTS 11,049,246 B2     6/2021  Tu et al.
2007/0038061 A1   2/2007  Huennekens et al.
(Continued)

FOREIGN PATENT DOCUMENTS

CN     103810709 A     5/2014
CN     105188550 A     12/2015
(Continued)

OTHER PUBLICATIONS

Rotger et al. "Corresponding IVUS and Angiogram Image Data" Computers in Cardiology 2001. vol. 28 (Cat. No. 01CH37287) Sep. 2021.
(Continued)

*Primary Examiner* — Amandeep Saini
*Assistant Examiner* — Mehrazul Islam
(74) *Attorney, Agent, or Firm* — Maschoff Brennan

(57) ABSTRACT

Methods registering an extravascular image with an intravascular image include obtaining a first feature information of a blood vessel segment in the intravascular image and obtaining a second feature information of a reference blood vessel in the extravascular image, where the reference blood vessel is an entire blood vessel in which the blood vessel segment is located. The methods also include performing a primary registration on the first and second feature information to obtain a third feature information that includes
(Continued)

First obtaining step: Obtaining a first feature information of a blood vessel segment of interest in the intravascular image, where the first feature information includes internal contour information and internal branch information of the blood vessel segment of interest — S1

Second obtaining step: Obtain a second feature information of a reference blood vessel in the extravascular image, where the reference blood vessel is an entire blood vessel in which the blood vessel segment of interest is located, and the second feature information includes external contour information and external branch information of the reference blood vessel — S2

Primary registration step: Perform a primary registration on the first feature information and the second feature information to obtain a third feature information, where the third feature information includes external contour information and external branch information of a target blood vessel segment that is in the extravascular image and corresponding to the blood vessel segment of interest — S3

Secondary registration step: Perform a secondary registration on the first feature information and the third feature information to obtain a target registration result — S4 external contour and external branch information of a target blood vessel segment in the extravascular image, corresponding to the blood vessel segment. A secondary registration is performed on the first and third feature information to obtain a target registration result. The method can implement fast and accurate registration of the external image and the intravascular image. The methods enable a corresponding apparatus computing device, and storage medium.

21 Claims, 4 Drawing Sheets

(51) Int. Cl.
    *G06T 7/33*    (2017.01)
    *G06T 7/62*    (2017.01)

(52) U.S. Cl.
    CPC ............... *G06T 2207/10101* (2013.01); *G06T 2207/10132* (2013.01); *G06T 2207/30101* (2013.01)

(58) Field of Classification Search
    CPC . G06T 2207/30101; G06T 2207/10116; G06T 2207/20016; G06T 7/33; A61B 6/504; A61B 6/5217; A61B 6/5247
    See application file for complete search history.

(56) References Cited

U.S. PATENT DOCUMENTS

| | | | |
|---|---|---|---|
| 2011/0176716 A1 | 7/2011 | Kim et al. | |
| 2015/0332461 A1* | 11/2015 | Kim | G06T 7/33 382/131 |
| 2022/0104786 A1* | 4/2022 | Kunio | A61B 5/318 |
| 2023/0108647 A1 | 4/2023 | Tu et al. | |

FOREIGN PATENT DOCUMENTS

| | | |
|---|---|---|
| CN | 105761254 A | 7/2016 |
| CN | 107123137 A | 9/2017 |
| CN | 107133959 A | 9/2017 |
| CN | 108038848 A | 5/2018 |
| CN | 108053429 A | 5/2018 |
| CN | 108198174 A | 6/2018 |
| CN | 108198211 A | 6/2018 |
| CN | 110288637 A | 9/2019 |
| CN | 111091567 A | 5/2020 |
| CN | 111369519 A | 7/2020 |
| CN | 111652917 A | 9/2020 |
| CN | 112509020 A | 3/2021 |

OTHER PUBLICATIONS

Tu et al. "Fusion of 3D QCA and IVUS/OCT" Int J Cardiovasc Imaging (Feb. 2011) 27:197-207.
Wang et al. "Image-Based Device Tracking for the Co-registration of Angiography and Intravascular Ultrasound Images" Med Image Comput Comput Assist Interv. 2011; 14(Pt 1):161-8. doi: 10.1007/978-3-642-23623-5_21.
Zhao et al. "Study on Angle Correction of IVUS Fusion in Coronary Artery CAG 3D Reconstruction Model" in Science Technology and Engineering, 2015, 15(36): 84-90.

* cited by examiner

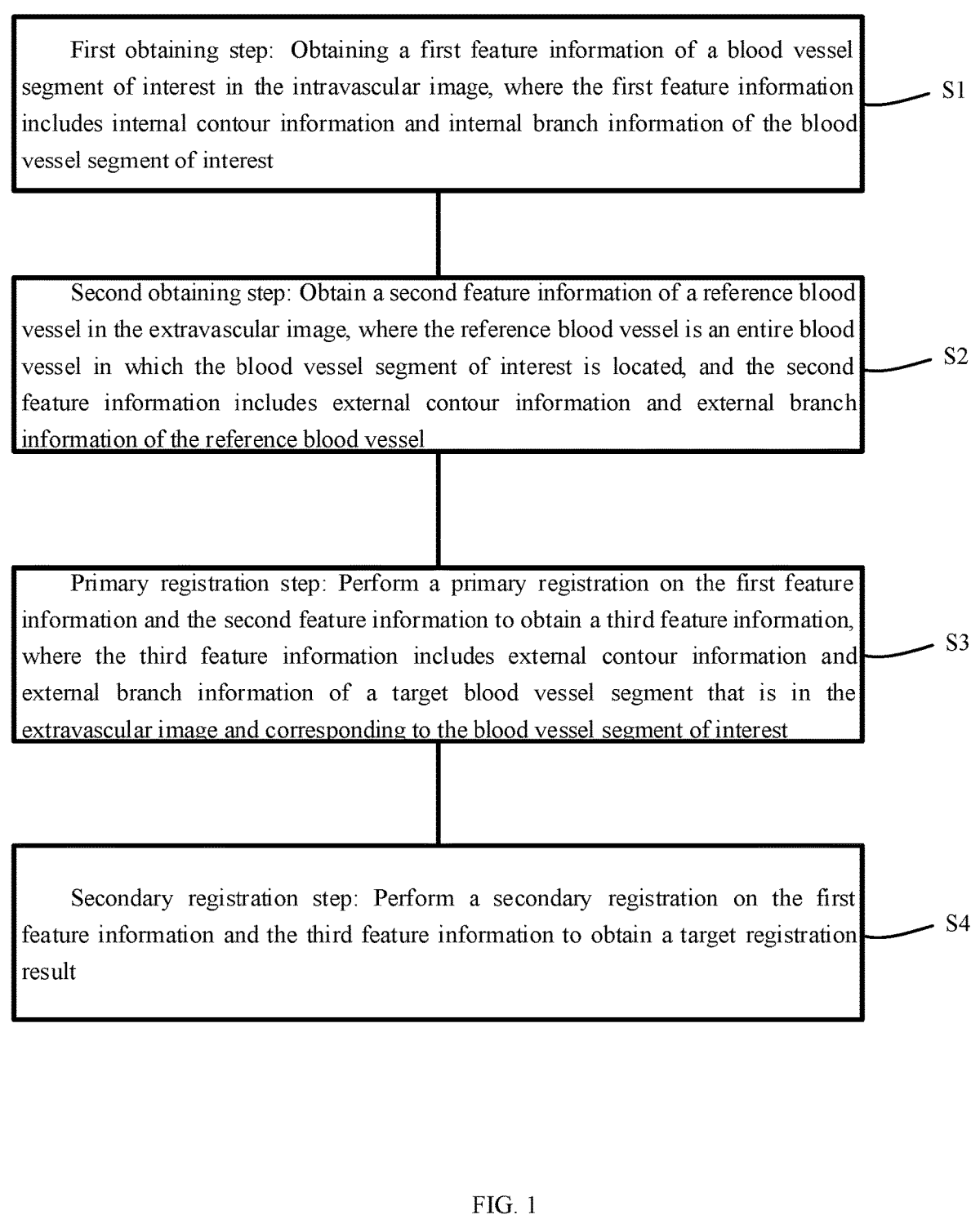

First obtaining step: Obtaining a first feature information of a blood vessel segment of interest in the intravascular image, where the first feature information includes internal contour information and internal branch information of the blood vessel segment of interest — S1

Second obtaining step: Obtain a second feature information of a reference blood vessel in the extravascular image, where the reference blood vessel is an entire blood vessel in which the blood vessel segment of interest is located, and the second feature information includes external contour information and external branch information of the reference blood vessel — S2

Primary registration step: Perform a primary registration on the first feature information and the second feature information to obtain a third feature information, where the third feature information includes external contour information and external branch information of a target blood vessel segment that is in the extravascular image and corresponding to the blood vessel segment of interest — S3

Secondary registration step: Perform a secondary registration on the first feature information and the third feature information to obtain a target registration result — S4

FIG. 1

Figure 2:
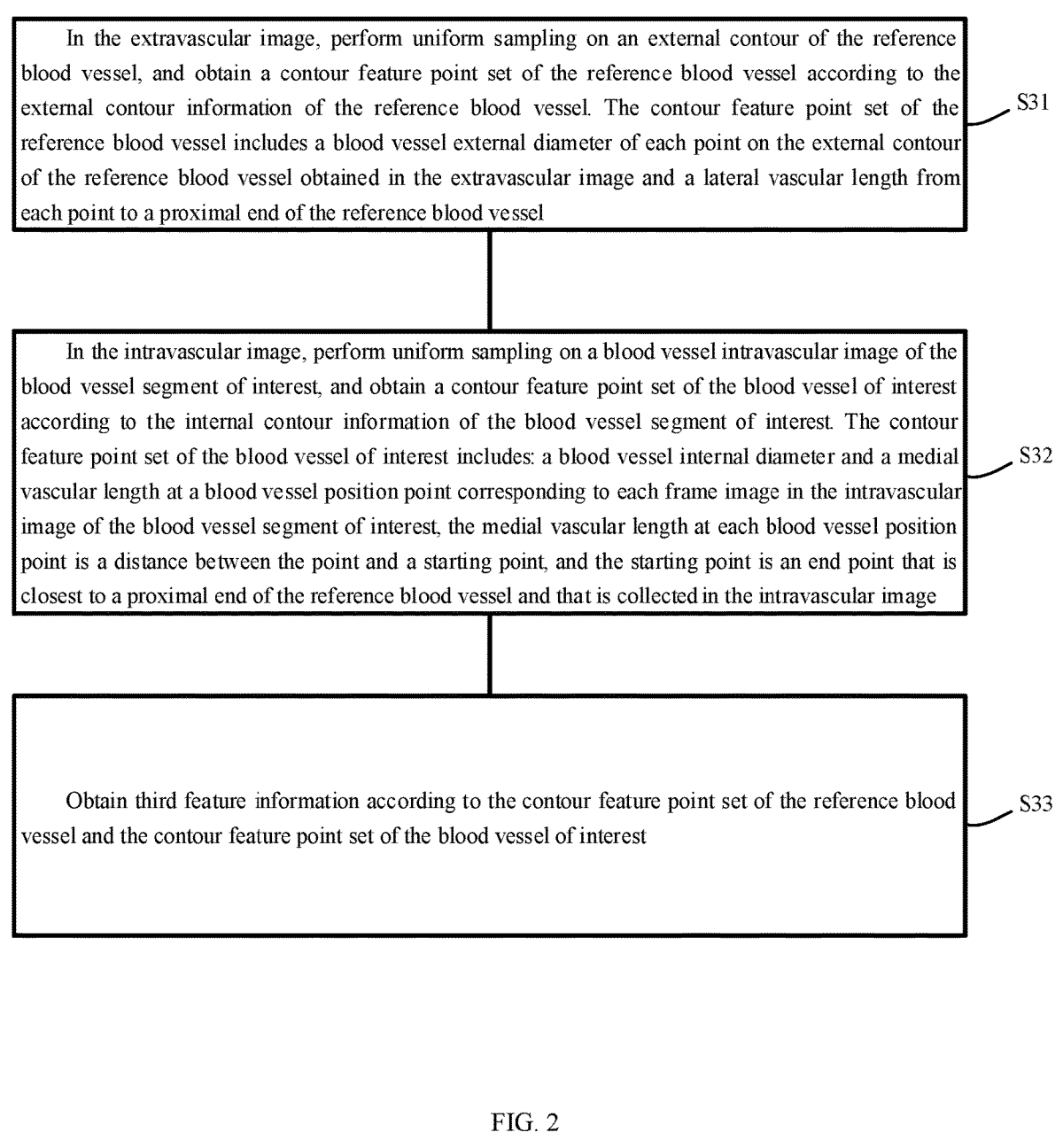

In the extravascular image, perform uniform sampling on an external contour of the reference blood vessel, and obtain a contour feature point set of the reference blood vessel according to the external contour information of the reference blood vessel. The contour feature point set of the reference blood vessel includes a blood vessel external diameter of each point on the external contour of the reference blood vessel obtained in the extravascular image and a lateral vascular length from each point to a proximal end of the reference blood vessel

S31

In the intravascular image, perform uniform sampling on a blood vessel intravascular image of the blood vessel segment of interest, and obtain a contour feature point set of the blood vessel of interest according to the internal contour information of the blood vessel segment of interest. The contour feature point set of the blood vessel of interest includes: a blood vessel internal diameter and a medial vascular length at a blood vessel position point corresponding to each frame image in the intravascular image of the blood vessel segment of interest, the medial vascular length at each blood vessel position point is a distance between the point and a starting point, and the starting point is an end point that is closest to a proximal end of the reference blood vessel and that is collected in the intravascular image

S32

Obtain third feature information according to the contour feature point set of the reference blood vessel and the contour feature point set of the blood vessel of interest

METHOD AND APPARATUS FOR REGISTERING EXTRAVASCULAR IMAGE WITH INTRAVASCULAR IMAGE, AND COMPUTING DEVICE

This application claims the priority to Chinese Patent Application No. 202011418428.X, filed with the Chinese Patent Office on Dec. 7, 2020 and entitled "METHOD AND APPARATUS FOR REGISTERING EXTRAVASCULAR IMAGE WITH INTRAVASCULAR IMAGE, AND COMPUTING DEVICE", which is incorporated herein by reference in its entirety.

TECHNICAL FIELD

The present invention relates to the medical field, and in particular, to a method and an apparatus for registering an extravascular image with an intravascular image, and a computing device.

BACKGROUND

Main imaging methods used in clinical diagnosis and treatment of coronary heart diseases include an extraluminal imaging technique such as coronary angiography and intravascular imaging such as optical coherence tomography (Optic Coherence Tomography, OCT) and intravenous ultrasound (Intravenous Ultrasound, IVUS). The coronary angiography can reflect a two-dimensional anatomical shape of coronary arteries, so that a specific location and a degree of stenosis of the coronary heart disease can be determined, but an abnormal position in a blood vessel wall is difficult to be clearly displayed, and information such as the shape and nature of the plaque cannot be provided. The intravascular image can clearly display a cross-section of the blood vessel, and can reflect a tissue structure of the blood vessel wall and a fine geometric anatomy, but the intravascular image cannot well reflect topological structure information of the blood vessel. Based on functional complementarity of coronary angiography and intravascular imaging, registration and fusion of coronary angiography images and intravascular images can not only observe a spatial position of a coronary vessel, but also obtain the inner and outer membranes and quantitative data of plaques of the blood vessel segment of interest, so that clinicians can be better assisted in a clinical assessment of the coronary heart disease.

At present, the registration of coronary angiography images and intravascular images is mainly implemented by three-dimensional reconstruction of coronary angiography images. For example, in a paper titled "Corresponding IVUS and angiogram image data" published in Computers in Cardiology in 2001 by D. Rotger, P. Radeva, C. Canero, et al., a three-dimensional model of a blood vessel was reconstructed by taking two pairs of angiography images at starting and ending points of a pullback path of a catheter and by using a biplane angiography device, and then was fused with IVUS according to a retraction speed of the catheter to obtain a three-dimensional model of the coronary artery. In a paper titled "Fusion of 3D QCA and IVUS/OCT" published in International Journal of Cardiovascular Imaging in 2011 by Shengxian Tu, Niels R Holm, Gerhard Koning, et al., a method is proposed in which a blood vessel segment of interest is selected from the angiograms of two different positions to perform three dimensional reconstruction, and based on the three dimensional reconstruction, registration with OCT/IVUS sequences is performed based on a distance matching algorithm (mainly involving the length and curvature of the blood vessel). However, the above methods all need to manually mark the starting and ending points of the OCT/IVUS image plane on the coronary angiogram, and manual search of a relationship between blood vessel angiography and OCT/IVUS data requires the operator to have professional knowledge, and the three-dimensional reconstruction requires two angiography positions to exposure an abnormal position of the blood vessel, a higher requirement for the angiography position is needed, and the consumed time of the algorithm is relatively long. In order to overcome the problem that the reconstruction of the previous two methods have a high requirement for the angiography position and a relatively long consumed time of the algorithm, Peng Wang, Terrence Chen, Olivier Ecabert, Simone Prummer, et al. published a paper titled "Image-based device tracking for the co-registration of angiography and intravascular ultrasound images" on "Med Image Comput Assist Interv" in 2011, proposed a method to continuously identify the position of IVUS images on angiography images by automatically detecting and tracking the IVUS sensor tip on angiography images, and implements unconstrained registration of angiography images and IVUS images. However, although this method solves the problem that the reconstruction process has a high requirement for the angiography position and a relatively long consumed time, fluorescent images need to be additionally obtained, and accuracy of detection and tracking of the IVUS sensor tip also greatly affects accuracy of registration.

SUMMARY

An objective of the present invention is to provide a method for registering an extravascular image with an intravascular image, to solve a problem that convenience and accuracy of registration cannot be taken into account in the prior art.

To solve the technical problem, an implementation of the present invention discloses a method for registering an extravascular image with an intravascular image, including the following steps:

a first obtaining step: obtaining a first feature information of a blood vessel segment of interest in the intravascular image, where the first feature information includes internal contour information and internal branch information of the blood vessel segment of interest;

a second obtaining step: obtaining a second feature information of a reference blood vessel in the extravascular image, where the reference blood vessel is an entire blood vessel in which the blood vessel segment of interest is located, and the second feature information includes external contour information and external branch information of the reference blood vessel;

primary registration step: performing a primary registration on the first feature information and the second feature information to obtain a third feature information, where the third feature information includes external contour information and external branch information of a target blood vessel segment that is in the extravascular image and corresponding to the blood vessel segment of interest; and secondary registration step: performing a secondary registration on the first feature information and the third feature information to obtain a target registration result.

The method for registering an extravascular image with an intravascular image in the technical solution is adopted, so that automatic registration of the coronary angiography image and the intravascular image can be directly implemented by using the diameter and branch information of the blood vessel and by using the multi-level registration method. In the method, only one frame of coronary angiography image needs to be detected and segmented, there is no need to perform manual labeling and three-dimensional reconstruction, and the method has advantages of rapidity, simplicity, high accuracy, and high robustness.

Optionally, the primary registration step includes:

in the extravascular image, performing uniform sampling on an external contour of the reference blood vessel, and obtaining a contour feature point set of the reference blood vessel according to the external contour information of the reference blood vessel, wherein the contour feature point set of the reference blood vessel includes a blood vessel external diameter at each point on the external contour of the reference blood vessel obtained in the extravascular image and a lateral vascular length from said each point to a proximal end of the reference blood vessel;

in the intravascular image, performing uniform sampling on a blood vessel intravascular image of a blood vessel segment of interest, and obtaining a contour feature point set of the blood vessel of interest according to the internal contour information of the blood vessel segment of interest, wherein the contour feature point set of the blood vessel of interest includes a blood vessel internal diameter and a medial vascular length at a blood vessel position point corresponding to each frame image in the intravascular image of the blood vessel segment of interest, wherein the medial vascular length at each blood vessel position point is a distance from said point to a starting point, and the starting point is an end point that is close to a proximal end of the blood vessel segment of interest and that is collected in the intravascular image; and obtaining the third feature information according to the contour feature point set of the reference blood vessel and the contour feature point set of the blood vessel of interest.

Optionally, the obtaining the third feature information according to the contour feature point set of the reference blood vessel and the contour feature point set of the blood vessel of interest includes:

constructing a reference region according to the contour feature point set of the reference blood vessel, and constructing a sliding window according to the contour feature point set of the blood vessel of interest;

making the sliding window slide in the reference region, calculating and obtaining a matching degree between each region in the reference region and the sliding window based on the contour feature point set of the reference blood vessel, the contour feature point set of the blood vessel of interest, the external branch information of the reference blood vessel, and the internal branch information of the blood vessel segment of interest; and comparing the matching degrees to obtain the third feature information.

Optionally, the external branch information of the reference blood vessel includes a serial number of each branch blood vessel of the reference blood vessel obtained in the extravascular image and a branch blood vessel external length from a bifurcation point of each branch blood vessel to the proximal end of the reference blood vessel; and the internal branch information of the blood vessel segment of interest includes a serial number of each branch blood vessel of the blood vessel segment of interest obtained from the intravascular image and a branch blood vessel internal length of each branch blood vessel from the starting point.

Optionally, the method for calculating a matching degree between each region in the reference region and the sliding window includes:

calculating a diameter matching score according to the blood vessel external diameter in the contour feature point set of the reference blood vessel and the blood vessel internal diameter in the contour feature point set of the blood vessel of interest;

calculating a branch matching score according to the external branch information of the reference blood vessel and the internal branch information of the blood vessel segment of interest; and constructing a matching function according to the diameter matching score and the branch matching score, and calculating the matching degree using the matching function.

Optionally, the diameter matching score is shown as:

$$S_d = \frac{1}{N}\sum_{i=1}^{N}|d_{si} - d_{ti}|,$$

Wherein $S_d$ indicates the diameter matching score, and N indicates the total number of feature points in the sliding window; $d_{si}$ indicates the blood vessel internal diameter corresponding to the $i^{th}$ feature point in the sliding window, and $d_{ti}$ indicates the blood vessel external diameter corresponding to the $i^{th}$ feature point in the reference region.

Optionally, the branch matching score is shown as:

$$S_b = \frac{1}{M}\sum_{i=1}^{M}dist_i,$$

wherein $S_b$ indicates the branch matching score, and M indicates the total number of branches in the sliding window; $dist_i$ indicates a distance between the $i^{th}$ branch blood vessel in the sliding window and a branch blood vessel that is closest to the branch blood vessel and that is in the reference region.

Optionally, the matching function is shown as:

$$S = \frac{1}{\beta S_d + (1 - \beta)S_b},$$

wherein S indicates the matching function, $S_d$ indicates the diameter matching score, $S_b$ indicates the branch matching score, $\beta$ indicates a weighting factor, and $0 < \beta < 1$.

Optionally, $\beta$ ranges from 0.3 to 0.7

Optionally, the target blood vessel segment is a blood vessel segment corresponding to a region having a highest matching degree with the sliding window in the reference region.

Optionally, in the extravascular image, the performing uniform sampling on an external contour of the reference blood vessel, and obtaining a contour feature point set of the reference blood vessel according to the external contour information of the reference blood vessel includes:

performing uniform sampling on an external contour curve of the reference blood vessel in the extravascular image, where the external contour of the reference blood vessel is discretized into various points;

constructing external contour feature points for the points by taking the lateral vascular length from each point to the proximal end of the reference blood vessel as the first-dimensional feature, and taking the blood vessel external diameter of this point as the second-dimensional feature; and obtaining the contour feature point set of the reference blood vessel according to all the external contour feature points.

Optionally, in the intravascular image, the performing uniform sampling on the intravascular image of the blood vessel segment of interest, and obtaining a contour feature point set of the blood vessel of interest according to the internal contour information of the blood vessel segment of interest includes:

detecting the intravascular image at each frame in a sequence image of the intravascular image as a detection point;

constructing an internal contour feature point of each frame image by taking the medial vascular length between the blood vessel position point corresponding to each frame image and the starting point as the first-dimensional feature, and taking the blood vessel internal diameter of the blood vessel position point as the second-dimensional feature; and obtaining the contour feature point set of the blood vessel of interest according to all the internal contour feature points.

Optionally, prior to constructing the reference region and the sliding window, the primary registration step further includes:

performing uniform sampling on the external contour of the reference blood vessel in the extravascular image according to a distance between any two adjacent points in the contour feature point set of the blood vessel of interest.

Optionally, the primary registration step further includes:

according to the third feature information, determining a blood vessel external diameter and a lateral vascular length corresponding to each point on an external contour curve of the target blood vessel segment in the extravascular image, and determining external branch information of the target blood vessel segment;

constructing an external contour feature point corresponding to each point on the target blood vessel segment by taking the lateral vascular length as the first-dimensional feature, and taking the blood vessel external diameter as the second-dimensional feature; and obtaining the contour feature point set of the target blood vessel according to all the external contour feature points.

Optionally, the target registration result is a target registration relationship between the contour feature point set of the blood vessel of interest and the contour feature point set of the target blood vessel.

Optionally, the secondary registration step includes the following steps performed in sequence:

a) performing normalization processing on the contour feature point set S of the blood vessel of interest and the contour feature point set T of the target blood vessel respectively, to obtain a normalized contour feature point set S' of the blood vessel of interest and a normalized contour feature point set T' of the target blood vessel;

b) calculating a feature error between the normalized contour feature point set S' of the blood vessel of interest and the normalized contour feature point set T' of the target blood vessel;

c) determining whether the feature error is less than a preset value, and if yes, determining the normalized contour feature point set S' of the blood vessel of interest as target feature information, and calculating the target registration relationship according to the target feature information and the normalized contour feature point set T' of the target blood vessel; otherwise, performing the following step;

d) calculating a registration transforming relationship between the normalized contour feature point set S' of the blood vessel of interest and the normalized contour feature point set T' of the target blood vessel, and obtaining, by using the registration transforming relationship, a new contour feature point set S" of the blood vessel of interest upon registration transformation of the normalized contour feature point set S' of the blood vessel of interest; and e) replacing the normalized contour feature point set S' of the blood vessel of interest with a new contour feature point set S" of the blood vessel of interest, and returning to step b).

Optionally, after step c), but prior to step d), the method further includes:

when the feature error is more than or equal to the preset value, determining whether a number of iteration times is more than a preset number, and if yes, determining the normalized contour feature point set S' of the blood vessel of interest as the target feature information, and calculating the target registration relationship according to the target feature information and the normalized contour feature point set T' of the target blood vessel; otherwise, increasing the number of iteration times by one, and performing the next step.

Optionally, prior to step b), the method further includes: setting the number of iteration times to zero.

Optionally, the secondary registration step includes: performing the secondary registration on the first feature information and the third feature information by using an iterative closest point algorithm or a coherent point drift algorithm or a robust point matching algorithm, to obtain the target registration result Optionally, the intravascular image is an OCT image or an IVUS image.

Correspondingly, the present invention further provides an apparatus for registering an extravascular image with an intravascular image, including:

a first obtaining module, configured to obtain a first feature information of a blood vessel segment of interest in the intravascular image, where the first feature information includes internal contour information and internal branch information of the blood vessel segment of interest;

a second obtaining module, configured to obtain a second feature information of a reference blood vessel in the extravascular image, where the reference blood vessel is an entire blood vessel in which the blood vessel segment of interest is located, and the second feature information includes external contour information and external branch information of the reference blood vessel;

a primary registration module, configured to perform a primary registration on the first feature information and the second feature information to obtain a third feature information, where the third feature information includes external contour information and external branch information of a target blood vessel segment that is in the extravascular image and corresponding to the blood vessel segment of interest; and a secondary registration module, configured to perform a secondary registration on the first feature information and the third feature information to obtain a target registration result.

Optionally, the primary registration module includes:

a first sampling unit, configured to: in the extravascular image, perform uniform sampling on an external contour of the reference blood vessel, and obtain a contour feature point set of the reference blood vessel according to the external contour information of the reference blood vessel, where the contour feature point set of the reference blood vessel includes a blood vessel external diameter and a lateral vascular length corresponding to each point on the external contour of the reference blood vessel obtained in the extravascular image;

a second sampling unit, configured to: in the intravascular image, perform sampling on a blood vessel intravascular image of the blood vessel segment of interest, and obtain a contour feature point set of the blood vessel of interest according to the internal contour information of the blood vessel segment of interest; where the contour feature point set of the blood vessel of interest includes a blood vessel internal diameter and a medial vascular length at a blood vessel position point corresponding to each frame image in the intravascular image of the blood vessel segment of interest, where the medial vascular length at each blood vessel position point is a distance from said point to a starting point, and the starting point is an end point that is closest to a proximal end of the reference blood vessel and that is collected in the intravascular image; and an obtaining unit, configured to obtain the third feature information according to the contour feature point set of the reference blood vessel and the contour feature point set of the blood vessel of interest.

Optionally, the obtaining module includes:

a window construction unit, configured to construct a reference region according to the contour feature point set of the reference blood vessel, and construct a sliding window according to the contour feature point set of the blood vessel of interest;

a matching degree calculation unit, configured to make the sliding window slide in the reference region, calculate and obtain a matching degree between each region in the reference region and the sliding window based on the contour feature point set of the reference blood vessel, the contour feature point set of the blood vessel of interest, the external branch information of the reference blood vessel, and the internal branch information of the blood vessel segment of interest; and a comparison unit, configured to compare the matching degrees to obtain the third feature information.

Optionally, the external branch information of the reference blood vessel includes a serial number of each branch blood vessel of the reference blood vessel obtained in the extravascular image and a branch blood vessel external length from a bifurcation point of each branch blood vessel to the proximal end of the reference blood vessel; the internal branch information of the blood vessel segment of interest includes a serial number of each branch blood vessel of the blood vessel segment of interest obtained in the intravascular image and a branch blood vessel internal length of each branch blood vessel from the starting point.

Optionally, the method for calculating a matching degree between each region in the reference region and the sliding window by the matching degree calculation unit includes:

calculating a diameter matching score according to the blood vessel external diameter in the contour feature point set of the reference blood vessel and the blood vessel internal diameter in the contour feature point set of the blood vessel of interest;

calculating a branch matching score according to the external branch information of the reference blood vessel and the internal branch information of the blood vessel segment of interest; and constructing a matching function according to the diameter matching score and the branch matching score, and calculating the matching degree using the matching function.

Optionally, the diameter matching score is shown as:

$$S_d = \frac{1}{N}\sum_{i=1}^{N}|d_{si} - d_{ti}|,$$

wherein $S_d$ indicates the diameter matching score, N indicates the total number of feature points in the sliding window; $d_{si}$ indicates the blood vessel internal diameter corresponding to the $i^{th}$ feature point in the sliding window, and $d_{ti}$ indicates the blood vessel external diameter corresponding to the $i^{th}$ feature point in the reference region.

Optionally, the branch matching score is shown as:

$$S_b = \frac{1}{M}\sum_{i=1}^{M}dist_i,$$

wherein $S_b$ indicates the branch matching score, and M indicates the total number of branches in the sliding window; $dist_i$ indicates a distance between the $i^{th}$ branch blood vessel in the sliding window and a branch blood vessel that is closest to the branch blood vessel and that is in the reference region.

Optionally, the matching function is shown as:

$$S = \frac{1}{\beta S_d + (1-\beta)S_b},$$

wherein S indicates the matching function, $S_d$ indicates the diameter matching score, $S_b$ indicates the branch matching score, $\beta$ indicates a weighting factor, and $0<\beta<1$.

Optionally, $\beta$ ranges from 0.3 to 0.7

Optionally, the target blood vessel segment is a blood vessel segment corresponding to a region having a highest matching degree with the sliding window in the reference region.

Optionally, the first sampling unit includes:

a first discretizing subunit, configured to: perform uniform sampling on an external contour curve of the reference blood vessel in the extravascular image, to discretize the external contour of the reference blood vessel into various points; and a first construction subunit, configured to: construct external contour feature points for the points by taking the lateral vascular length from each point to the proximal end of the reference blood vessel as the first-dimensional feature, and taking the blood vessel external diameter of this point as the second-dimensional feature; and obtain the contour feature point set of the reference blood vessel according to all the external contour feature points.

Optionally, the second sampling unit includes:

a second frame division subunit, configured to detect the intravascular image at each frame in the intravascular image sequence image as a detection point; and a second construction subunit, configured to: construct an internal contour feature point of each frame image by taking the medial vascular length between the blood vessel position point corresponding to each frame image and the starting point as the first-dimensional feature, and taking the blood vessel internal diameter of the blood vessel position point as the second-dimensional feature, and obtain the contour feature point set of the blood vessel of interest according to all the internal contour feature points.

Optionally, the primary registration module further includes:

a distance calculation unit, configured to calculate a distance between two adjacent points in the contour feature point set of the blood vessel of interest before the window construction unit constructs the reference region and the sliding window; where the first sampling unit is further configured to: in the extravascular image, perform uniform resampling on the external contour of the reference blood vessel according to the distance.

Optionally, the first sampling unit is further configured to: according to the third feature information, determine a blood vessel external diameter and a lateral vascular length corresponding to each point on an external contour curve of the target blood vessel segment in the extravascular image, and determine external branch information of the target blood vessel segment; construct an external contour feature point corresponding to each point on the target blood vessel segment by taking the lateral vascular length as the first-dimensional feature, and taking the blood vessel external diameter as the second-dimensional feature; and obtain the contour feature point set of the target blood vessel according to all the external contour feature points.

Optionally, the target registration result is a target registration relationship between the contour feature point set of the blood vessel of interest and the contour feature point set of the target blood vessel.

Optionally, the secondary registration module includes:

a normalization unit, configured to perform normalization processing on the contour feature point set S of the blood vessel of interest and the contour feature point set T of the target blood vessel respectively, to obtain a normalized contour feature point set S' of the blood vessel of interest and a normalized contour feature point set T' of the target blood vessel;

an error calculation unit, configured to: receive the normalized contour feature point set S' of the blood vessel of interest and the normalized contour feature point set T' of the target blood vessel that are output by the normalization unit, and calculate a feature error between the normalized contour feature point set S' of the blood vessel of interest and the normalized contour feature point set T' of the target blood vessel; and configured to: when the feature error between the normalized contour feature point set S' of the blood vessel of interest and the normalized contour feature point set T' of the target blood vessel is more than or equal to a preset value, receive an updated contour feature point set S' of the blood vessel interest output by an updating unit, and calculate the feature error between the updated contour feature point set S' of the blood vessel of interest and the normalized contour feature point set T' of the target blood vessel;

an error determining unit, configured to determine whether the feature error calculated by the error calculation unit is less than a preset value;

a registration relationship calculation unit, configured to: determine, when the error determining unit determines that the feature error is less than a preset value, the normalized contour feature point set S' of the blood vessel of interest as target feature information, and calculate the target registration relationship according to the target feature information and the normalized contour feature point set T' of the target blood vessel;

a transforming relationship calculation unit, configured to: when the error determining unit determines that the feature error is more than or equal to the preset value, obtain a registration transforming relationship between the normalized contour feature point set S' of the blood vessel of interest and the normalized contour feature point set T' of the target blood vessel, and obtain, by using the registration transforming relationship, a new contour feature point set S" of the blood vessel of interest obtained upon registration transformation of the normalized contour feature point set S' of the blood vessel of interest; and an updating unit, configured to replace the contour feature point set S' of the blood vessel of interest with a new contour feature point set S" of the blood vessel of interest obtained by the transforming relationship calculation unit.

Optionally, the secondary registration module further includes:

an iteration times determining unit, configured to determine whether a number of iteration times is more than a preset number when the error determining unit determines that the feature error is more than or equal to the preset value; and an accumulating unit, configured to increase one to the number of iteration times when the iteration times determining unit determines that the number of iteration times is less than the preset number of iteration times; wherein the registration relationship calculation unit is further configured to: when the iteration times determining unit determines that the number of iteration times is more than the preset number of iteration times, determine the normalized contour feature point set S' of the blood vessel of interest as the target feature information, and calculate the target registration relationship according to the target feature information and the normalized contour feature point set T' of the target blood vessel.

Optionally, the secondary registration module further includes:

an initialization unit, configured to set the number of iteration times to zero before the error calculation unit calculates a feature error between the normalized contour feature point set S' of the blood vessel of interest and the normalized contour feature point set T' of the target blood vessel.

Optionally, the secondary registration module performs secondary registration on the first feature information and the third feature information by using an iterative closest point algorithm or a coherent point drift algorithm or a robust point matching algorithm, to obtain the target registration result.

Optionally, the intravascular image is an OCT image or an IVUS image.

Correspondingly, the present invention further provides a computing device, including:

a processor, for implement various instructions;

a memory, for storing a plurality of instructions, said instructions being for the processor and execute the method for registering an extravascular image with an intravascular image.

The computing device of the above technical solution is adopted, so that rapid and accurate registration of the extravascular image with the intravascular image can be implemented.

Correspondingly, the present invention further provides a storage medium, which stores a plurality of instructions for a processor to load and execute the method for registering an extravascular image with an intravascular image.

The storage medium of the above technical solution is adopted, so that rapid and accurate registration of the extravascular image with the intravascular image can be implemented.

BRIEF DESCRIPTION OF DRAWINGS

FIG. 1 is a flowchart of a method for registering an extravascular image with an intravascular image according to the present invention;

FIG. 2 is a flowchart of a primary registration step in a method for registering an extravascular image with an intravascular image according to the present invention;

DETAILED DESCRIPTION OF EMBODIMENTS

Figure 3:
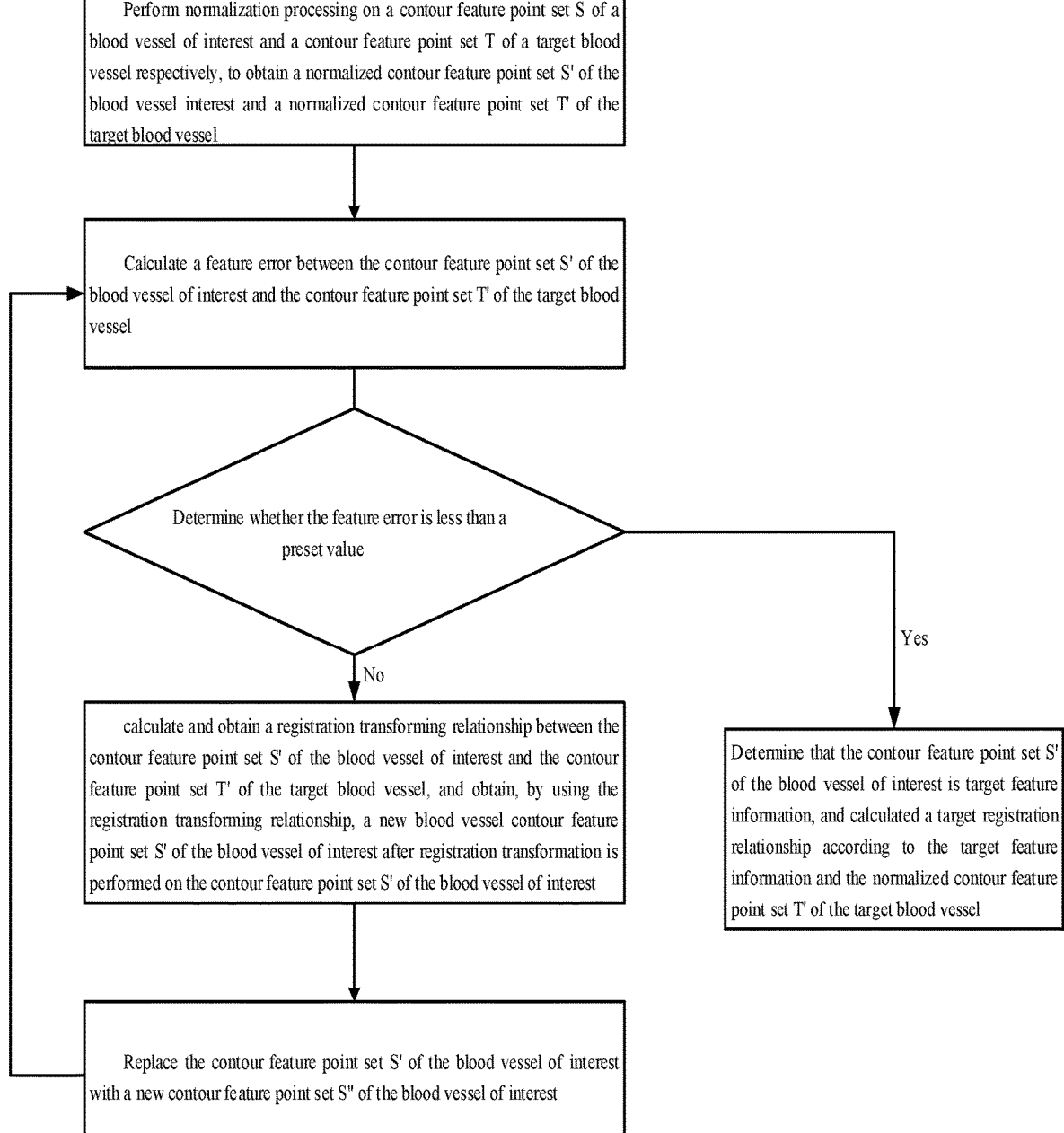
FIG. 3 is a flowchart of a secondary registration step in a method for registering an extravascular image with an intravascular image according to the present invention.

The implementations of the present invention are described below by using specific embodiments, and a person skilled in the art can easily understand other advantages and effects of the present invention from the contents disclosed in this description. Although the description of the invention is presented in conjunction with the preferred embodiment, this does not mean that the features of the invention are limited to this implementation. On the contrary, the purpose of introducing the invention in conjunction with the embodiments is to cover other options or modifications that may be extended based on the claims of the present invention. The following description contains numerous specific details in order to provide a thorough understanding of the present invention. The present invention may also be practiced without these details. Furthermore, some specific details are omitted from the description in order to avoid obscuring or obscuring the gist of the present invention. It should be noted that the embodiments of the present invention and the features of the embodiments may be combined with each other under the condition of no conflict.

It should be noted that in this description, similar numerals and letters refer to similar items in the following figures. Therefore, once an item is defined in one figure, there is no need to define the item in subsequent figures for further definitions and explanations.

The terms "first", "second", etc. are only used to differentiate the description and should not be construed as indicating or implying relative importance.

The terms "proximal end" and "distal end" are relative positions based on the distance of a blood vessel from an aorta. The end near the aorta is the proximal end, and the end far from the aorta is the distal end.

In order to make the objectives, technical solutions and advantages of the present invention clearer, the implementations of the present invention are further described in detail below with reference to the accompanying drawings.

Referring to FIG. 1, the present invention discloses a method for registering an extravascular image with an intravascular image, including the following steps:

A first obtaining step S1: Obtain a first feature information of a blood vessel segment of interest in the intravascular image, where the first feature information includes internal contour information and internal branch information of the blood vessel segment of interest.

Specifically, the blood vessel segment of interest may be a certain blood vessel segment that is abnormal relative to a normal blood vessel. In the embodiment of the present invention, the intravascular image may be an OCT image or may be an IVUS image. That is, the internal contour information and internal branch information are obtained from the intravascular image such as the OCT/IVUS image. The internal contour information may include a blood vessel internal diameter and a medial vascular length at each point in the blood vessel. The blood vessel internal diameter refers to a blood vessel diameter obtained from the intravascular image; and the medial vascular length is a length along an axis of the blood vessel from a certain point in the blood vessel to a starting point. Specifically, the starting point is an endpoint that is near a proximal end of the blood vessel segment of interest and that is collected in the intravascular image. Because pullback and imaging of OCT are performed from a distal end to a proximal end, this starting point can also be said to be an ending point of the OCT pullback. The internal branch information may include a serial number of an internal branch (the serial number includes information of which branch on the blood vessel the branch belongs to) and position information of the branch relative to the blood vessel segment of interest.

For obtaining first feature information of a blood vessel segment of interest in the obtained blood vessel intravascular image, the intravascular image may be a directly obtained image that only includes the blood vessel segment of interest and that has been isolated, or may be an image that is selected from an intravascular image of a segment of blood vessel and that is corresponding to the blood vessel segment of interest. This is not limited in the present invention. The intravascular image can be directly imported related data, or may be obtained from real-time configuration connections from other resource libraries, or may be obtained after searching a stored image database based on information such as a name of a user. This is not limited in the present invention. Optionally, the intravascular image data may be in a DICOM (Digital Imaging and Communications in Medicine) format. DICOM has the following advantages: Almost all protocols of information exchange such as collection, archiving, communication, display and query of medical digital images are covered; and a set of object sets including information such as various types of medical diagnostic images, and related analyses and reports of the medical diagnostic images is defined by using an open and interconnected architecture and an object-oriented method; service classes and command sets used for information transmission and exchange, and standard responses to messages are defined; the techniques for identifying various information objects are described in detail; service support applied to a network environment (OSI or TCP/IP) is provided; and a conformance statement (Conformance Statement) of a manufacturer is structurally defined. The implementation of medical image information exchange can be greatly simplified by using the DICOM format, and synergy with other medical application systems such as HIS and RIS is facilitated.

A second obtaining step S2: Obtain a second feature information of a reference blood vessel in the extravascular image, wherein the reference blood vessel is an entire blood vessel in which the blood vessel segment of interest is located, and the second feature information includes external contour information and external branch information of the reference blood vessel.

Specifically, the extravascular image may be a coronary angiography image, which reflects external contour information of the blood vessel. The person skilled in the art can understand that, certainly, an external image of a blood vessel segment corresponding to the blood vessel segment of interest can also be directly captured. However, the applicant has found that, relative to directly collecting and obtaining the blood vessel segment corresponding to the blood vessel segment of interest, information of the external image of the entire blood vessel (that is, the entire blood vessel from a proximal end of the blood vessel to a distal end of the blood vessel) in which the blood vessel segment of interest is located is collected in this step in this implementation. It seems that redundant information is collected. In fact, combined with the subsequent processing steps, it is more beneficial to improve processing efficiency as a whole.

Specifically, the external contour information may include a blood vessel external diameter and a lateral vascular length at each position in the blood vessel, the blood vessel external diameter refers to a blood vessel diameter obtained according to the extravascular image, and the lateral vascular length is a length along an axis of the blood vessel from a position on an external contour of the blood vessel to a proximal end of the blood vessel. The external branch information may include a serial number of an external branch blood vessel (the serial number includes information of which branch on the blood vessel the branch belongs to) and position information of the external branch blood vessel relative to the reference blood vessel.

Primary registration step S3: Perform a primary registration on the first feature information and the second feature information to obtain a third feature information, where the third feature information includes external contour information and external branch information of a target blood vessel segment that is in the extravascular image and corresponding to the blood vessel segment of interest. It should be noted that the blood vessel segment of interest mentioned in the text is located inside the blood vessel, and the target blood vessel segment refers to a blood vessel segment that is located outside the blood vessel and that is corresponding to the blood vessel segment of interest.

That is, to more comprehensively grasp the status of the blood vessel segment of interest, information of the blood vessel inside and the blood vessel outside of the blood vessel segment of interest needs to be known respectively, and the second feature information is the external contour information of the entire reference blood vessel. Therefore, registration is performed on the first feature information and the second feature information to obtain the required external contour information of the target blood vessel segment.

Secondary registration step S4: Perform a secondary registration on the first feature information and the third feature information to obtain a target registration result.

Optionally, the target registration result may be target feature information, where a feature error between the target feature information and the third feature information satisfies a preset condition. Alternatively, the target registration result may be a target registration relationship between the first feature information and the third feature information. Further alternatively, the target registration result may include not only the above target feature information, but also a target registration relationship between the first feature information and the third feature information.

In the primary registration step, registration is roughly performed on only the first feature information and the second feature information to obtain the required external contour information of the blood vessel of interest. Therefore, there may be a wrong matching or a large deviation between the first feature information and the third feature information obtained in step S3, and matching needs to be further performed on the first feature information and the third feature information by using secondary registration.

It should be noted that, in the method for registering an extravascular image with an intravascular image provided by the present invention, the sequence of the first obtaining step and the sequence of the second obtaining step can be exchanged, that is, the first feature information of the blood vessel segment of interest can be obtained first, and then the second feature information of the entire blood vessel in which the blood vessel segment of interest is located is obtained. Alternatively, the second feature information of the entire blood vessel in which the blood vessel segment of interest is located may be obtained first, and then the first feature information of the blood vessel segment of interest may be obtained. Further alternatively, the first feature information of the blood vessel segment of interest and the second feature information of the entire blood vessel in which the blood vessel segment of interest is located may be simultaneously obtained. The sequence of obtaining the first feature information of the blood vessel segment of interest and the second feature information of the entire blood vessel in which the blood vessel segment of interest is located is not limited in the present invention.

Specifically, the method for registering an extravascular image with an intravascular image mentioned in the present invention can be applied to registration of an external image and an intravascular image of a coronary artery blood vessel such as a left circumflex coronary artery, a left anterior descending coronary artery, or a right coronary artery.

In the method for registering an extravascular image with an intravascular image provided by the present invention, the diameter and branch information of the blood vessel are fully used, and automatic registration of the coronary angiography image and the intravascular image is directly implemented by using the multi-level registration method. In the method, only one frame of coronary angiography image needs to be detected and segmented, and there is no need to perform manual labeling and three-dimensional reconstruction, and the method has the advantages of quickness, simplicity, high accuracy and high robustness. The robustness here refers to the degree to which the method is affected by the data needed in the calculation, and high robustness means that the registration method is less affected by data fluctuations, that is, the registration method has high stability.

Further, during specific implementation, in the process of capturing an OCT/IVUS intravascular image, due to various physiological or physical factors, an OCT/IVUS probe may be disturbed. Therefore, a capturing plane of the OCT/IVUS image is not perpendicular to a blood vessel surface, and accuracy of subsequent primary registration and secondary registration is further affected. In order to avoid this effect, before the primary registration is performed, angle correction can be performed on the obtained OCT/IVUS image, to improve accuracy of coarse registration and fine registration. Specifically, angle correction can be performed on the OCT/IVUS image by using the method proposed in the paper entitled "Study on Angle Correction of IVUS Fusion in Coronary Artery CAG 3D Reconstruction Model" published by Zhao Haisheng, Yang Feng, Lin Mudan, et al. in Science Technology and Engineering, 2015, 15(36): 84-90.

Specifically, as shown in FIG. 2, the primary registration step S3 may specifically include the following steps:

Step S31: In the extravascular image, perform uniform sampling on an external contour of the reference blood vessel, and obtain a contour feature point set of the reference blood vessel according to the external contour information of the reference blood vessel. The contour feature point set of the reference blood vessel includes a blood vessel external diameter of each point on the external contour of the reference blood vessel obtained in the extravascular image and a lateral vascular length from each point to a proximal end of the reference blood vessel.

Specifically, in this step, a process of obtaining the contour feature point set of the reference blood vessel may include: performing uniform sampling on an external contour curve of the reference blood vessel in the extravascular image, to discretize the external contour of the reference blood vessel into various points; constructing external contour feature points for the points by taking the lateral vascular length of each point from a proximal end of the reference blood vessel as the first-dimensional feature, and taking the blood vessel external diameter of this point as the second-dimensional feature; and obtaining the reference blood vessel contour feature point set according to all the external contour feature points.

Optionally, when the extravascular image is sampled, uniform sampling may be performed on the external image by using each pixel in the external image as a sampling point, to obtain a blood vessel external diameter and a lateral vascular length corresponding to each pixel on the external contour curve of the blood vessel. Certainly, uniform sampling may be performed on the external image at an interval of one or two or more pixels. This is not limited herein.

Further, the coronary blood vessel in the external image can be segmented by combining a prediction result obtained by a traditional segmentation algorithm or a deep learning algorithm or deep learning with prior knowledge obtained by designing based on a conventional method, and information such as the lateral vascular length and the blood vessel external diameter is obtained through calculation by using a segmentation result. For example, in the patent with the application number CN202010134217.7, the coronary blood vessel is segmented by using the method of deep learning model to obtain information such as the length and the diameter.

Step S32: In the intravascular image, perform uniform sampling on a blood vessel intravascular image of the blood vessel segment of interest, and obtain a contour feature point set of the blood vessel of interest according to the internal contour information of the blood vessel segment of interest. The contour feature point set of the blood vessel of interest includes: a blood vessel internal diameter and a medial vascular length at a blood vessel position point corresponding to each frame image in the intravascular image of the blood vessel segment of interest.

Specifically, the intravascular image is a sequence image, and one frame image is corresponding to a blood vessel cross-sectional image at a certain position inside the blood vessel, that is, the intravascular image includes blood vessel cross-sectional images at various positions inside the blood vessel. Generally, a shooting frequency of an OCT/IVUS intravascular image is 100 frame/s or 180 frame/s, and a pullback speed of a catheter is 18 mm/s or 20 mm/s or 36 mm/s, and an internal structure of the blood vessel is photographed by pulling back the catheter inside the blood vessel. When uniform sampling is performed on the intravascular image, the blood vessel internal diameter and the medial vascular length of each position point inside the blood vessel corresponding to each frame intravascular image may be obtained by using each frame intravascular image can be used as a sampling point.

Specifically, the process of obtaining the contour feature point set of the blood vessel of interest may include the following steps: Detect the intravascular image by using each frame in the sequence image of the intravascular image as a detection point; construct an internal contour feature point of each frame image by taking a medial vascular length between a blood vessel position point corresponding to each frame image and a starting point as the first-dimensional feature, and taking a blood vessel internal diameter of the blood vessel position point as the second-dimensional feature; and obtain the contour feature point set of the blood vessel of interest according to all the internal contour feature points. It should be noted that, in addition to the method of detecting each frame of blood vessel intravascular image to obtain the contour feature point set of the blood vessel of interest, the contour feature point set of the blood vessel of interest can also be obtained by performing detection at an interval of one frame or performing detection at a fixed interval of frames. Specifically, uniform sampling is performed on the image sequence image of the intravascular image at an interval of one frame, two frames, and multiple frames. An internal contour feature point of each frame image is constructed by taking a medial vascular length between a blood vessel position point corresponding to each detection point image and a starting point as one-dimensional feature, and taking a blood vessel internal diameter of the blood vessel position point as the second-dimensional feature. A contour feature point set of the blood vessel of interest is obtained according to all the internal contour feature points.

Further, the blood vessel may be segmented by using the method mentioned in the Chinese patent with the patent number of CN201710438256.4 to obtain contour information such as the medial vascular length and the blood vessel internal diameter.

In other words, when a contour feature point set of the reference blood vessel is constructed, firstly, an external contour curve of the reference blood vessel is discretized, each point on the contour curve of the reference blood vessel is represented by a two-dimensional vector, the first-dimensional feature of the two-dimensional vector is a lateral vascular length at the point, the second-dimensional feature of the two-dimensional vector is a blood vessel external diameter at the point, and then a set of two-dimensional vectors corresponding to the points is used as a contour feature point set of the reference blood vessel. Similarly, the construction process of the contour feature point set of the blood vessel of interest is generally similar to that of the contour feature point set of the reference blood vessel. However, because the OCT/IVUS intravascular image is a discrete frame-by-frame sequence image, there is no need to discretize the intravascular image, each frame image is directly used as a sampling point, blood vessel position information corresponding to each frame image may also be represented by a two-dimensional vector, and the first-dimensional feature of the two-dimensional vector may be a medial vascular length at a blood vessel point corresponding to the corresponding frame image, and the second-dimensional feature may be a blood vessel internal diameter at this point, and then a set of two-dimensional vectors corresponding to frame images is used as a contour feature point set of the blood vessel of interest.

It should be noted that each point in the contour feature point set of the reference blood vessel and the contour feature point set of the blood vessel of interest may be represented not only by a two-dimensional vector, but also may be represented by a three-dimensional vector or a multi-dimensional vector. When the point is represented by the three-dimensional vector or the multi-dimensional vector, each-dimensional feature in the vector may be feature information such as respectively a length, a diameter, a blood vessel cross-sectional area, a branch blood vessel diameter, a branch opening direction.

Step S33: Obtain a third feature information according to the contour feature point set of the reference blood vessel and the contour feature point set of the blood vessel of interest.

Further, primary registration may be performed on the contour feature point set of the reference blood vessel and the contour feature point set of the blood vessel of interest based on a sliding window fast target detection method to obtain the third feature information. Specifically, the primary registration process may include the following steps:

Step S331: Construct a reference region according to the contour feature point set of the reference blood vessel, and construct a sliding window according to the contour feature point set of the blood vessel of interest.

Optionally, a starting point of the blood vessel segment of interest in the intravascular image (that is, an endpoint near a proximal endpoint of the reference blood vessel) may be used as a left boundary of the sliding window, and an ending point of the blood vessel segment of interest in the intravascular image (that is, an endpoint near a distal endpoint of the reference blood vessel) can be used as a right boundary of the sliding window. The boundaries of a sliding region are respectively the proximal endpoint and distal endpoint of the reference blood vessel.

Step S332: Make the sliding window slide in the reference region, calculate and obtain a matching degree between each region in the reference region and the sliding window based on the contour feature point set of the reference blood vessel, the contour feature point set of the blood vessel of interest, the external branch information of the reference blood vessel, and the internal branch information of the blood vessel segment of interest.

Specifically, the external branch information of the reference blood vessel may include a serial number of each branch blood vessel of the reference blood vessel obtained in the extravascular image and a branch blood external length from a bifurcation point of each branch blood vessel to the proximal end of the reference blood vessel; the internal branch information of the blood vessel segment of interest includes a serial number of each branch blood vessel of the blood vessel segment of interest obtained in the intravascular image and a branch blood internal length of each branch blood vessel from the starting point. Because the feature points in the contour feature point set of the reference blood vessel and the contour feature point set of the blood vessel of interest are arranged in a sequence, serial numbers of branch blood vessels are also automatically sorted according to positions of the branches on the blood vessel contour line.

Specifically, during the sliding process, the left boundary of the sliding window can coincide with the proximal endpoint of the reference region, and then the sliding window is gradually slid from the proximal endpoint of the reference region to the distal endpoint of the reference region. Alternatively, the right boundary of the sliding window may coincide with the distal endpoint of the reference region, and then the sliding window is gradually slid from the distal endpoint of the reference region to the proximal endpoint of the reference region. The sliding direction is not limited herein.

Specifically, in the sliding process, each time the sliding window moves by a point in the reference region, a matching degree between the sliding window and a sub-region corresponding to the current sliding window in the reference region is calculated once, that is, during the sliding process, the total times of calculations of the matching degree is equal to a difference between the total number of points in the contour feature point set of the reference blood vessel and the total number of points in the contour feature point set of the blood vessel of interest. Certainly, the matching degree between the sliding window and the sub-region corresponding to the current sliding window in the reference region can be calculated once each time the sliding window moves by two or more points in the reference region. That is, in the present invention, it is only necessary to ensure that primary registration of the first feature information and the second feature information can be implemented by using the calculated matching degrees, and there is no requirement for the quantity of matching degrees to be used.

Further, a matching degree between the coronary artery reference blood vessel segment in the external image of the current reference region and the coronary artery blood vessel segment of interest in the OCT/IVUS intravascular image may be calculated by using a target evaluation function, and the matching degree can be calculated based on the diameter information and branch information. Certainly, calculation of the matching degree is performed when each point in the feature point set is a two-dimensional vector. When each point in the feature point set is a three-dimensional or multi-dimensional vector, the matching degree may be further calculated based on the diameter information, branch information and other information included in the vector. This is not limited herein.

Further, in order to make it easier to calculate the matching degree between the sliding window and each sub-region in the corresponding region during the sliding process, a distance between the points in the sliding window can be set to be equal to a distance between the points in the reference region. Therefore, in the present invention, prior to the reference region and the sliding window are constructed, the following step may be further included: Perform uniform resampling on the external contour of the reference blood vessel in the extravascular image according to the distance between any two adjacent points in the contour feature point set of the blood vessel of interest. Specifically, when the intravascular image is an OCT or IVUS image, a distance between two adjacent points in the contour feature point set of the blood vessel of interest can be calculated according to a pullback speed of a catheter and a shooting frequency of OCT/IVUS, and then the distance is taken as a sampling step, and uniform re-sampling is performed on the external contour of the reference blood vessel in the extravascular image. Specifically, a distance between two adjacent points in the contour feature point set of the blood vessel of interest is equal to a product of the catheter pullback speed and the time taken to capture a frame of intravascular image, and the time taken to capture a frame of intravascular image is equal to the reciprocal of the shooting frequency, so that the distance is equal to the catheter pullback speed divided by the shooting frequency.

Further, the method of calculating the matching degree between each region in the reference region and the sliding window includes the following steps:

A diameter matching score is calculated according to the blood vessel external diameter in the contour feature point set of the reference blood vessel and the blood vessel internal diameter in the contour feature point set of the blood vessel of interest. The diameter matching score can be shown as:

$$S_d = \frac{1}{N} \sum_{i=1}^{N} |d_{si} - d_{ti}| \qquad (1)$$

In the formula (1), $S_d$ indicates a diameter matching score, N indicates the total number of feature points in the sliding window, that is, the total number of points in the contour feature point set of the blood vessel of interest; $d_{si}$ indicates a blood vessel internal diameter corresponding to the $i^{th}$ feature point in the sliding window, and $d_{ti}$ indicates a blood vessel external diameter corresponding to the $i^{th}$ feature point in the reference region. More specifically, $d_{ti}$ is a blood vessel external diameter corresponding to the $i^{th}$ feature point in a sub-reference region in which the current sliding window is located in the reference region. That is, the $i^{th}$ feature point of the reference region mentioned in the formula (1) is actually the $i^{th}$ feature point in the sub-reference region in which the current sliding window is located in the reference region, and changes during move-ment of the sliding window.

A branch matching score is calculated based on the external branch information of the reference blood vessel and the internal branch information of the blood vessel segment of interest. The branch matching score can be shown as:

$$S_b = \frac{1}{M} \sum_{i=1}^{M} dist_i \qquad (2)$$

In the formula (2), $S_b$ indicates a branch matching score, M indicates the total number of branches in the sliding window, that is, the total number of all branch blood vessels in the blood vessel segment of interest; $dist_i$ indicates a distance between the $i^{th}$ branch blood vessel in the sliding window and a branch blood vessel that is closest to the $i^{th}$ branch blood vessel in the reference region. Specifically, the distance $dist_i$ can be calculated by using the position of the branch at the blood vessel (that is, a length of the branch blood vessel from the starting point of the blood vessel). If a branch blood vessel internal length vessel at a position of the $i^{th}$ branch of the sliding window is l1, and a branch blood vessel external length at a position of a branch that is closest to the $i^{th}$ branch and that is in the reference region is l2, the distance $dist_i = |l1 - l2|$.

According to the diameter matching score and the branch matching score, a matching function is constructed, and the matching degree is calculated by using the matching func-tion.

Specifically, the matching function can be shown as:

$$S = \frac{1}{\beta S_d + (1 - \beta) S_b} \qquad (3)$$

In the formula (3), S indicates a matching function, $S_d$ represents the diameter matching score, $S_b$ indicates the branch matching score, and $\beta$ indicates a weighting factor, and $0 \leq \beta < 1$. $\beta$ can be set according to the importance of the diameter information and the branch information or the obtained precision of the two. For example, when the diameter information and branch information are considered equally important, $\beta$ can be set to 0.5. If detection precision or an accuracy rate of one of the two items is low, reducing the weighting factor of this item may be considered. In the formula (3), $\beta$ can be regarded as a weighting factor of diameter information, and $1-\beta$ can be regarded as a weight-ing factor of the branch information.

Optionally, in the present invention, $\beta$ is set to be 0.3-0.7.

Step S333: Compare the matching degrees to obtain third feature information.

Specifically, the matching degree between the sliding window and each sub-region in the reference region is calculated according to the formula (3), the target blood vessel segment is a blood vessel segment corresponding to the sub-region having the highest matching degree of the sliding window in the reference region, and the third feature information is the contour feature point set of the target blood vessel corresponding to the target blood vessel seg-ment.

That is, in one embodiment of the present invention, the primary registration step is to perform rough registration on the external image and the OCT/IVUS intravascular image by combining the diameter information and the branch information and by using the sliding window fast target detection method. In this method, the calculation process is simple, a problem of manually locating the starting point and the ending point of the blood vessel of the corresponding OCT/IVUS image in the external coronary angiography image is solved, so that manual operation steps are reduced, and the degree of automation of the algorithm is improved.

Further, the primary registration step S3 may further include: establishing a contour feature point set of the target blood vessel, and specifics are as follows:

a blood vessel external diameter and a lateral vascular length corresponding to each point on an external contour curve of the target blood vessel segment in the extravascular image are determined according to the third feature information, and the external branch infor-mation of the target blood vessel segment is deter-mined.

An external contour feature point corresponding to each point on the target blood vessel segment is constructed by taking the lateral vascular length as the first-dimensional feature, and taking the blood vessel external diameter as the second-dimensional feature.

The contour feature point set of the target blood vessel is obtained according to all the external contour feature points.

Further, based on the rough matching result of the primary registration step S3, the secondary registration step S4 may perform iterative computing on the contour feature point set of the blood vessel of interest and the contour feature point set of the target blood vessel by using a registration algorithm that fuses the diameter information and the branch information to minimize a difference between the two contour feature point sets, so as to achieve a purpose of precise registration. Optionally, the target registration result can be selected as a corresponding registration relationship between the first feature information and the third feature information. Specifically, the corresponding registration relationship can be calculated based on the contour feature point set of the target blood vessel and the contour feature point set of the blood vessel of interest. The feature point set is calculated, that is, the corresponding registration relationship between the first feature information and the third feature information may specifically be the target registration relationship between the contour feature point set of the target blood vessel and the contour feature point set of the blood vessel of interest.

Specifically, as shown in FIG. 3, in the secondary registration process, the contour feature point set of the blood vessel of interest in the OCT/IVUS intravascular image is set to be S, and the contour feature point set of the target blood vessel in the external angiography image is set to be T, and the secondary registration step S4 may include the following steps:

a) Perform normalization processing on the contour feature point set S of the blood vessel of interest and the contour feature point set T of the target blood vessel respectively, to obtain a normalized contour feature point set S' of the blood vessel interest and a normalized contour feature point set T' of the target blood vessel;

b) Calculate a feature error between the normalized contour feature point set S' of the blood vessel of interest and the normalized contour feature point set T' of the target blood vessel. Specifically, a calculation formula of the feature error may be $$E = \sum_{i=1}^{N}\sum_{j=1}^{N} m_{ij}\|t_i - s_j\|^2,$$

where $t_i$ is an $i^{th}$ feature point in the contour feature point set of the target blood vessel, $s_j$ is a $j^{th}$ feature point in the contour feature point set of the blood vessel of interest, $m_{ij}$ is a matching degree between the points $t_i$ and $s_j$, N is a total number of feature points in the contour feature point set of the target blood vessel or in the contour feature point set of the blood vessel of interest;

c) Determine whether the feature error is less than a preset value, if yes, it is considered that registration is completed, determine that the contour feature point set S' of the blood vessel of interest is the target feature information, and calculate the target registration relationship according to the target feature information and the normalized contour feature point set T' of the target blood vessel; otherwise, go to the following step.

Specifically, the preset value can be set according to an actual situation, and can be set to 0.01 in general, that is, when the feature error is less than 0.01, it is considered that registration is completed.

d) Calculate and obtain a registration transforming relationship between the normalized contour feature point set S' of the blood vessel of interest and the normalized contour feature point set T' of the target blood vessel, and obtain, by using the registration transforming relationship, a new contour feature point set S" of the blood vessel of interest upon registration transformation of the contour feature point set S' of the blood vessel of interest.

Specifically, the registration transforming relationship f is a spatial variation function of non-rigid deformation, and f=sd+w, where d is an affine transformation matrix, and w is a non-affine deformation term.

e) Replace the normalized contour feature point set S' of the blood vessel of interest with a new contour feature point set S" of the blood vessel of interest, and return to step b).

During specific implementation, a case may appear in which because the preset value is set to be relatively small, no matter how the above iteration process is performed, the calculated feature error is always more than or equal to the preset value, which may fall into an infinite loop, thereby affecting registration efficiency. In order to solve this problem, the applicant finds that in the iteration process, the feature error between the updated contour feature point set of the blood vessel of interest and the contour feature point set of the target blood vessel gradually decreases with the increase of the number of iteration times. Therefore, in one embodiment of the present invention, the occurrence of the infinite loop in the iteration process can be avoided by setting the maximum number of iteration times. That is, even if in the iteration process, the feature error is not less than the preset value, when the final cumulative number of iteration times reaches a certain value, it can be considered that the purpose of fine registration has been achieved at this time.

Specifically, a determining condition can be added between step c) and step d), and the determining condition can include:

When the feature error is more than or equal to the preset value, it is determined whether the number of iteration times is more than a preset number, and if yes, it is considered that registration is completed, and the normalized contour feature point set S' of the blood vessel of interest is determined as the target feature information, and the target registration relationship is calculated according to the target feature information and the normalized contour feature point set T' of the target blood vessel; otherwise, the number of iteration times is increased by one, and the following step is performed. Specifically, the preset number may be set according to an actual situation, for example, may be set to 100 times.

Further, in order to facilitate calculation and determining of the number of iteration times, the number of iteration times may be set to zero prior to step b). Through the above iteration solution process, the difference between the two contour feature point sets is minimized, so as to implement a one-to-one correspondence between the points in the feature point set corresponding to the external image of the target blood vessel segment and the points in the feature point set corresponding to the intravascular image of the blood vessel segment of interest respectively.

It can be learned from the above that upon the secondary registration is performed through the above steps, not only the corresponding registration relationship between the first feature information and the third feature information can be obtained, but also the target feature information that the feature error between the target feature information and the third feature information meets the preset condition can be obtained.

Further, in the secondary registration step, an iterative closest point algorithm or a coherent point drift algorithm or a robust point matching algorithm can be used to perform secondary registration on the first feature information and the third feature information to obtain a target registration result.

A non-rigid registration algorithm that fuses diameter information and branch information is adopted for the secondary registration step. Through the process of iterative optimization, the feature difference between the two point sets is minimized, mapping parameters between the two point sets are obtained, and the corresponding relationship between the two point sets is found, so that the registration is implemented. The diameter and the branch information can directly reflect contour topological features of the vascular tissue, and this method has higher stability than the method in which registration is performed by positioning of an IVUS sensor tip.

In the registration method of the extravascular image and the intravascular image provided by the present invention, accurate registration of multimodal blood vessel images is implemented by multi-level registration (coarse registration and fine registration) based on the contour information of the external coronary image and the OCT/IVUS intravascular image. In the method, one-stop automatic multimodal image registration is implemented, manual operation steps are reduced, and errors caused by human factors are largely avoided. In addition, the registration process does not require three-dimensional reconstruction of the extravascular image, so that complexity and time-consuming of the registration algorithm are reduced.

Figure 4:
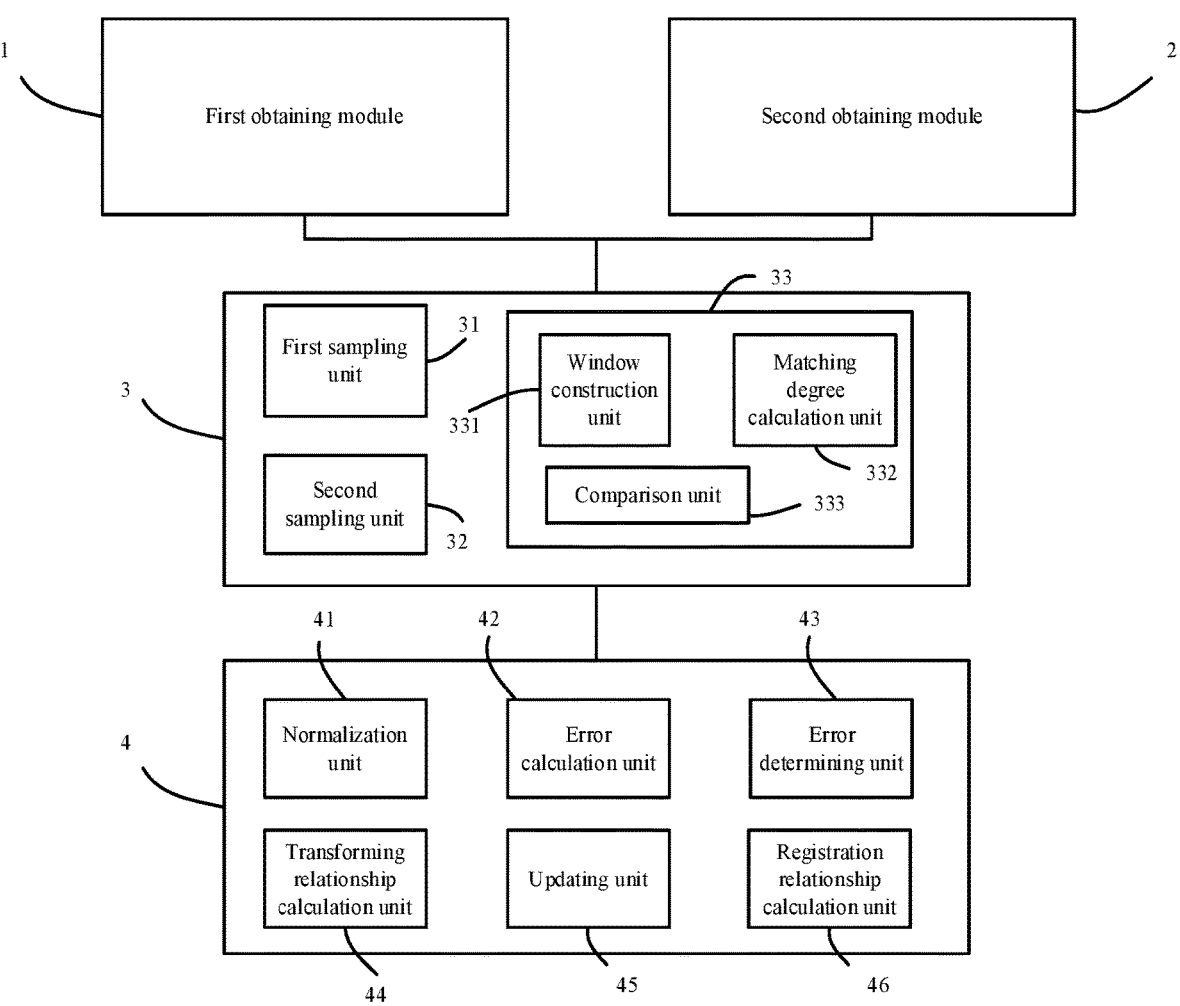
FIG. 4 is a structural block diagram of an apparatus for registering an extravascular image with an intravascular image according to the present invention.

Correspondingly, as shown in FIG. 4, the present invention further provides an apparatus for registering an extravascular image with an intravascular image, including a first obtaining module 1, a second obtaining module 2, a primary registration module 3, and a secondary registration module 4. The first obtaining module 1 is configured to obtain a first feature information of a blood vessel segment of interest in the intravascular image, and the first feature information includes internal contour information and internal branch information of the blood vessel segment of interest. The second acquisition module 2 is configured to obtain a second feature information of a reference blood vessel in the extravascular image, the reference blood vessel is an entire blood vessel in which the blood vessel segment of interest is located, and the second feature information includes external contour information and external branch information of the reference blood vessel. The primary registration module 3 is configured to perform a primary registration on the first feature information and the second feature information to obtain a third feature information, and the third feature information includes external contour information and external branch information of the target blood vessel segment corresponding to the blood vessel segment of interest in the extravascular image. The secondary registration module 4 is configured to perform a secondary registration on the first feature information and the third feature information to obtain a target registration result.

Optionally, the target registration result may be target feature information that a feature error between the target feature information and the third feature information meets a preset condition. Alternatively, the target registration result may be a target registration relationship between the first feature information and the third feature information. Further alternatively, the target registration result may include not only the target feature information, but also include the target registration relationship between the first feature information and the third feature information.

Specifically, the primary registration module 3 may include:

a first sampling unit 31, configured to: in the extravascular image, perform uniform sampling on an external contour of the reference blood vessel, and obtain a contour feature point set of the reference blood vessel according to the external contour information of the reference blood vessel, where the contour feature point set of the reference blood vessel includes a blood vessel external diameter and a lateral vascular length corresponding to each point on the external contour of the reference blood vessel obtained in the extravascular image;

a second sampling unit 32, configured to: in the intravascular image, perform sampling on a blood vessel intravascular image of the blood vessel segment of interest, and obtain a contour feature point set of the blood vessel of interest according to the internal contour information of the blood vessel segment of interest; where the contour feature point set of the blood vessel of interest includes a blood vessel internal diameter and a medial vascular length at a blood vessel position point corresponding to each frame image in the intravascular image of the blood vessel segment of interest, where the medial vascular length at each blood vessel position point is a distance between the point and a starting point, and the starting point is an endpoint that is close to a proximal end of the blood vessel segment of interest and that is collected in the intravascular image; and an obtaining unit 33, configured to obtain the third feature information according to the contour feature point set of the reference blood vessel and the contour feature point set of the blood vessel of interest.

Optionally, when performing sampling on the extravascular image, the first sampling unit 31 may perform uniform sampling on the external image by using each pixel in the external image as a sampling point, to obtain a blood vessel external diameter and a lateral vascular length corresponding to each pixel on the external contour curve of the blood vessel.

Optionally, the intravascular image is an OCT image or an IVUS image. Generally, a shooting frequency of an OCT/IVUS intravascular image is 100 frame/s or 180 frame/s, and a pullback speed of a catheter is 18 mm/s or 20 mm/s or 36 mm/s, and an internal structure of the blood vessel is photographed by pulling back the catheter inside the blood vessel. When performing uniform sampling on the intravascular image, the second sampling unit 32 may obtain the blood vessel internal diameter and the medial vascular length of each position point inside the blood vessel corresponding to each frame intravascular image by using each frame intravascular image as a sampling point.

Optionally, the obtaining unit 33 may specifically include: a window construction unit 331, configured to construct a reference region according to the contour feature point set of the reference blood vessel, and construct a sliding window according to the contour feature point set of the blood vessel of interest; a matching degree calculation unit 332, configured to make the sliding window slide in the reference region, and calculate a matching degree between each region in the reference region and the sliding window according to the contour feature point set of the reference blood vessel, the contour feature point set of the blood vessel of interest, the external branch information of the reference blood vessel and the internal branch information of the blood vessel segment of interest; and a comparison unit 333, configure to compare the matching degrees to obtain the third feature information.

Optionally, the external branch information of the reference blood vessel includes a serial number of each branch blood vessel of the reference blood vessel obtained in the extravascular image and a branch blood vessel external length from a bifurcation point of each branch blood vessel to the proximal end of the reference blood vessel; the internal branch information of the blood vessel segment of interest includes a serial number of each branch blood vessel of the blood vessel segment of interest obtained in the intravascular image and a branch blood vessel internal length of each branch blood vessel from the starting point.

Optionally, the method for calculating the matching degree between each region in the reference region and the sliding window by the matching degree calculation unit includes: according to the blood vessel external diameter in the contour feature point set of the reference blood vessel and the blood vessel internal diameter in the contour feature point set of the blood vessel of interest, calculating a diameter matching score; calculating a branch matching score according to the external branch information of the reference blood vessel and the internal branch information of the blood vessel segment of interest; building a matching function according to the diameter matching score and the branch matching score, and calculating the matching degree by using the matching function.

Optionally, the diameter matching score is as follows:

$$S_d = \frac{1}{N}\sum_{i=1}^{N}|d_{si} - d_{ti}|$$

Where, $S_d$ indicates a diameter matching score, N indicates the total number of feature points in the sliding window, $d_{si}$ indicates a blood vessel internal diameter corresponding to the feature point in the sliding window, and $d_{ti}$ indicates a blood vessel external diameter corresponding to the $i^{th}$ feature point in the reference region. More specifically, $d_{ti}$ is a blood vessel external diameter corresponding to the $i^{th}$ feature point in a sub-reference region in which the current sliding window is located in the reference region. That is, the $i^{th}$ feature point of the reference region mentioned in the above formula is actually the $i^{th}$ feature point in the sub-reference region in which the current sliding window is located in the reference region, and changes during the moving process of the sliding window.

Optionally, the branch matching score is as follows:

$$S_b = \frac{1}{M}\sum_{i=1}^{M}dist_i$$

Where, $S_b$ indicates a branch matching score, M indicates the total number of branches in the sliding window, and $dist_i$ indicates a distance between the $i^{th}$ branch blood vessel in the sliding window and a branch blood vessel closest to the $i^{th}$ branch blood vessel in the reference region. Specifically, the distance $dist_i$ can be calculated by using the position of the branch at the blood vessel (that is, the length of the branch blood vessel from the starting point of the blood vessel). For example, the branch blood vessel internal length at the position of the $i^{th}$ branch of the sliding window is l1, and the branch blood vessel external length at the position of a branch closest to the $i^{th}$ branch is l2, then the distance $dist_i = |l1 - l2|$.

Optionally, the matching function is as follows:

$$S = \frac{1}{\beta S_d + (1 - \beta)S_b}$$

Where, S indicates a matching function, $S_d$ indicates a diameter matching score, $S_b$ indicates a branch matching score, $\beta$ indicates a weighting factor, and $0 < \beta < 1$. Where, $\beta$ can be set according to the importance of the diameter information and the branch information or the obtained precision of the two. For example, when the diameter information and the branch information are considered equally important, $\beta$ can be set to 0.5. If detection accuracy or an accuracy rate of one of the two items is low, reducing the weighting factor of this item may be considered. In the above matching function, $\beta$ can be regarded as the weighting factor of diameter information, and $1-\beta$ can be regarded as the weighting factor of branch information.

Optionally, $\beta$ ranges from 0.3 to 0.7.

Optionally, the blood vessel segment corresponding to the region with the greatest matching degree with the sliding window in the reference region is the target blood vessel segment.

Optionally, the first sampling unit 31 includes: a first discretizing subunit, configured to perform uniform sampling on an external contour curve of the reference blood vessel in the extravascular image, and discretize the external contour of the reference blood vessel into various points; a first construction subunit, configured to construct external contour feature points for the points by taking the lateral vascular length from each point to the proximal end of the reference blood vessel as the first-dimensional feature, and taking the blood vessel external diameter of this point as the second-dimensional feature; and obtain the contour feature point set of the reference blood vessel according to all the external contour feature points.

Optionally, the second sampling unit 32 includes: a second frame division subunit, configured to detect the intravascular image by using each frame in the sequence image of the intravascular image as a detection point; and a second construction subunit, configured to construct an internal contour feature point of each frame image by taking the medial vascular length between the blood vessel position point and the starting point corresponding to each frame image as the first-dimensional feature, and taking the blood vessel internal diameter of the blood vessel position point as the second-dimensional feature; and obtain a contour feature point set of the blood vessel of interest according to all the internal contour feature points.

It should be noted that, the second frame division subunit can not only detect each frame of blood vessel intravascular image, so that the second construction subunit obtains the contour feature point set of the blood vessel of interest, but also can perform detection on the intravascular image at an interval of one frame or can perform detection at a fixed interval of frames, so that the second construction subunit obtains the contour feature point set of the blood vessel of interest.

Specifically, when the first sampling unit 31 constructs the contour feature point set of the reference blood vessel, the first discretizing subunit discretizes the external contour curve of the reference blood vessel, and the first construction subunit uses a two-dimensional vector to refer to each point on the contour curve of the reference blood vessel, the first-dimensional feature of the two-dimensional vector is the lateral vascular length at the point, and the second-dimensional feature of the two-dimensional vector is the blood vessel external diameter at the point. A set of two-dimensional vectors corresponding to the points is the contour feature point set of the reference blood vessel. Similarly, the process of constructing the contour feature point set of the blood vessel of interest by the second sampling unit 32 is generally similar to the above construction process. However, because the OCT/IVUS intravascular image is a discrete frame-by-frame sequence image, there is no need to discrete the intravascular image, and the second frame division subunit directly uses each frame of image as a sampling point. The second construction subunit uses a two-dimensional vector to refer to the blood vessel position information corresponding to each frame image, the first-dimensional feature of the two-dimensional vector can be the medial vascular length at the blood vessel point corresponding to the frame image, and the second-dimensional feature of the two-dimensional vector can be the blood vessel internal diameter at the point, and then the second construction subunit takes a set of two-dimensional vectors corresponding to frame images as the contour feature point set of the blood vessel of interest.

It should be noted that each point in the reference blood vessel contour feature point set and the blood vessel contour feature point set of interest can be represented not only by a two-dimensional vector, but also by a three-dimensional vector or a multi-dimensional vector; when the point is represented by the three-dimensional or multi-dimensional vector, the each-dimensional feature of the vector can be feature information such as respectively a length, a diameter, a blood vessel cross-sectional area, a branch blood vessel diameter, and a branch opening direction.

Optionally, the primary registration module 3 further includes: a distance calculation unit, configured to calculate a distance between two adjacent points in the contour feature point set of the blood vessel of interest before the window construction unit constructs the reference region and the sliding window. The first sampling unit 31 is further configured to: in the extravascular image, perform uniform re-sampling on the external contour of the reference blood vessel according to the distance.

Specifically, when the intravascular image is an OCT or IVUS image, the distance calculation unit can calculate a distance between two adjacent points in the contour feature point set of the blood vessel of interest according to a pullback speed of a catheter and a shooting frequency of OCT/IVUS, and the distance is equal to a result of dividing the pullback speed of the catheter by the photographing frequency. The first sampling unit 31 then uses the distance as a sampling step to perform uniform sampling on the external contour of the reference blood vessel in the extravascular image. In this way, the distance between the points in the sliding window is set to be equal to the distance between the points in the reference region, which makes it easier to calculate the matching degree between the sliding window in the sliding process and each sub-region in the corresponding region.

Optionally, the first sampling unit 31 is further configured to: according to the third feature information, determine a blood vessel external diameter and a lateral vascular length corresponding to each point on an external contour curve of the target blood vessel segment in the extravascular image, and determine external branch information of the target blood vessel segment; construct an external contour feature point corresponding to each point on the target blood vessel segment by taking the lateral vascular length as the first-dimensional feature, and taking the blood vessel external diameter as the second-dimensional feature; and obtain the contour feature point set of the target blood vessel according to all the external contour feature points.

Optionally, the target registration result can be selected as the corresponding registration relationship between the first feature information and the third feature information. Specifically, the corresponding registration relationship can be calculated based on the contour feature point set of the target blood vessel and the contour feature point set of the blood vessel of interest, that is, the corresponding registration relationship between the first feature information and the third feature information may specifically be the target registration relationship between the contour feature point set of the target blood vessel and the contour feature point set of the blood vessel of interest.

Optionally, the secondary registration module 4 includes:
a normalization unit 41, configured to perform normalization processing on the contour feature point set S of the blood vessel of interest and the contour feature point set T of the target blood vessel respectively, to obtain a normalized contour feature point set S' of the blood vessel of interest and a normalized contour feature point set T' of the target blood vessel;
an error calculation unit 42, configured to: receive the normalized contour feature point set S' of the blood vessel of interest and the normalized contour feature point set T' of the target blood vessel that are output by the normalization unit, and calculate a feature error between the contour feature point set S' of the blood vessel of interest and the contour feature point set T' of the target blood vessel; and configured to: when the feature error between the normalized contour feature point set S' of the blood vessel of interest and the normalized contour feature point set T' of the target blood vessel is more than or equal to a preset value, receive an updated contour feature point set S' of the blood vessel interest output by the updating unit, and calculate the feature error between the updated contour feature point set S' of the blood vessel of interest and the contour feature point set T' of the target blood vessel;
an error determining unit 43, configured to determine whether the feature error calculated by the error calculation unit 42 is less than a preset value;
a registration relationship calculation unit 46, configured to: determine, when the error determining unit 43 determines that the feature error is less than a preset value, the contour feature point set S' of the blood vessel of interest as target feature information, and calculate the target registration relationship according to the target feature information and the normalized contour feature point set T' of the target blood vessel;
a transforming relationship calculation unit 44, configured to: when the error determining unit 43 determines that the feature error is more than or equal to the preset value, obtain a registration transforming relationship between the contour feature point set S' of the blood vessel of interest and the contour feature point set T' of the target blood vessel, and obtain, by using the registration transforming relationship, a new contour feature point set S" of the blood vessel of interest obtained after registration and transformation are performed on the contour feature point set S' of the blood vessel of interest; and an updating unit 45, configured to replace the contour feature point set S' of the blood vessel of interest with a new contour feature point set S" of the blood vessel of interest obtained by the transforming relationship calculation unit 44.

Specifically, the preset value can be set according to an actual situation, and can be set to in general, that is, when the feature error is less than 0.01, it is considered that registration is completed.

Optionally, the secondary registration module 4 may further include:

an iteration times determining unit, configured to determine whether a number of iteration times is more than a preset number when the error determining unit determines that the feature error is more than or equal to the preset value; and an accumulating unit, configured to increase the number of iteration times by one when the iteration times determining unit determines that the number of iteration times is less than the preset number.

The registration relationship calculation unit 46 is further configured to: when the iteration times determining unit determines that the number of iteration times is more than the preset number, determine that the normalized contour feature point set S' of the blood vessel of interest is the target feature information, and calculate the target registration relationship based on the target feature information and the normalized contour feature point set T' of the target blood vessel.

Specifically, the preset number may be set according to an actual situation, for example, 100 times.

Optionally, the secondary registration module 4 further includes an initialization unit, configured to set the quantity of iteration times to zero before the error calculation unit calculates a feature error between the normalized contour feature point set S' of the blood vessel of interest and the normalized contour feature point set T' of the target blood vessel.

Optionally, the secondary registration module 4 performs secondary registration on the first feature information and the third feature information by using an iterative closest point algorithm or a coherent point drift algorithm or a robust point matching algorithm, to obtain the target registration result.

The apparatus for registering an extravascular image with an intravascular image in the technical solution is adopted, so that automatic registration of the coronary angiography image and the intravascular image can be directly implemented by using the diameter and branch information of the blood vessel and by using the multi-level registration method. The apparatus needs to detect and segment only one frame of coronary angiography image, there is no need to perform manual labeling and three-dimensional reconstruction, and the apparatus has advantages of rapidity, simplicity, high accuracy, and high robustness.

The present invention further provides a computing device, including: a processor, suitable to implement various instructions; a memory, suitable to store a plurality of instructions, where the instructions are suitable to be loaded by the processor and execute the method for registering an extravascular image with an intravascular image.

The computing device of the above technical solution is adopted, so that rapid and accurate registration of an extravascular image with an intravascular image can be implemented.

An embodiment of the present invention further discloses a storage medium, the storage medium stores a plurality of instructions, and the instructions are suitable to be loaded by the processor and execute the method for registering an extravascular image with an intravascular image.

The storage medium of the above technical solution is adopted, so that rapid and accurate registration of an extravascular image and an intravascular image can be implemented.

The various embodiments disclosed herein may be implemented in hardware, software, firmware, or a combination of these implementation methods. The embodiments of the present application may be implemented as a computer program or program code executing on a programmable system including at least one processor, a storage system (including a volatile and nonvolatile memory and/or a storage element), at least one input device, and at least one output device. Program code may be applied to input instructions to perform the functions described herein and to generate output information. The output information can be applied to one or more output devices in a known manner. For the objective of this application, a processing system includes any system having a processor such as, for example, a digital signal processor (DSP), a microcontroller, an application specific integrated circuit (ASIC), or a microprocessor.

The program code may be implemented in a high-level procedural language or an object-oriented programming language to communicate with the processing system. The program code may also be implemented in assembly or machine language when needed. In fact, the mechanism described in this application is not limited in the scope of any particular programming language. In either case, the language may be a compiled language or an interpreted language.

In some cases, the disclosed embodiments may be implemented in hardware, firmware, software, or any combination thereof. The disclosed embodiments can further be implemented as instructions carried by or stored on one or more transitory or non-transitory machine-readable (for example, computer-readable) storage media, which can be read and executed by one or more processors. For example, the instructions may be distributed over a network or over another computer-readable medium. Therefore, a machine-readable medium can include any mechanism for storing or transmitting information in a machine (for example, a computer) readable form, and includes, but is not limited to, a floppy disk, an optical disk, an optical disk, a compact disc read-only memory (CD-ROM), a magnetic optical disc, a read only memory (ROM), a random access memory (RAM), an erasable programmable read only memory (EPROM), an electrically erasable programmable read only memory (EEPROM), a magnetic card or an optical card, a flash memory, or a tangible machine-readable memory for transmitting information (for example, a carrier wave, an infrared signal, and a digital signal) using the Internet in electrical, optical, acoustic, or other forms of propagating signals. Therefore, the machine-readable medium includes any type of machine-readable medium suitable for storing or transmitting electronic instructions or information in a machine (for example, a computer) readable form.

In the drawings, some structural or method features may be shown in specific arrangements and/or sequences. It should be understood, however, that such specific arrangements and/or orderings may not be required. Rather, in some embodiments, the features may be arranged in a manner and/or order different from that shown in the illustrative figures. Additionally, the inclusion of structural or method features in a particular figure is not meant to imply that such features are required in all embodiments, and in some embodiments, these features may not be included or may be combined with other features.

It should be noted that each module/unit mentioned in each device embodiment of this application is a logical module/unit. Physically, a logical module/unit may be a physical module/unit or may be a part of a physical module/unit, or may be implemented by a combination of multiple physical modules/units. The physical implementation of these logical modules/units is not the most important, and the combination of functions implemented by these logical modules/units is the key to solving the technical problems raised by the present application. In addition, in order to highlight the innovative part of the present application, the above device embodiments of the present application do not introduce modules/units that are not closely related to solving the technical problems raised in the present application, which does not mean that other modules/units do not exist in the device embodiments.

Although the present invention has been illustrated and described by referring to some preferred embodiments of the present invention, persons of ordinary skill in the art should understand that the above content is a further detailed description of the present invention in conjunction with specific embodiments, and it cannot be assumed that embodiments of the present invention are limited only by these descriptions. Persons skilled in the art may make various changes in form and details, including making several simple deductions or substitutions, without departing from the spirit and scope of the present invention.

The invention claimed is:

1. A method for registering an extravascular image with an intravascular image, comprising:

a first obtaining step: obtaining a first feature information of a blood vessel segment of interest in the intravascular image, wherein the first feature information includes internal contour information and internal branch information of the blood vessel segment of interest, wherein the first feature information is obtained based on a segmentation of a lumen boundary in a plurality of intravascular image frames for computation of the internal contour information and a detection of branch locations in the plurality of intravascular image frames for the internal branch information;

a second obtaining step: obtaining a second feature information of a reference blood vessel in the extravascular image, wherein the reference blood vessel is an entire blood vessel in which the blood vessel segment of interest is located, and the second feature information includes external contour information and external branch information of the reference blood vessel;

primary registration step: performing a primary registration on the first feature information and the second feature information to obtain a third feature information, wherein the third feature information includes external contour information and external branch information of a target blood vessel segment that is in the extravascular image and corresponding to the blood vessel segment of interest, wherein the primary registration step comprises:

in the extravascular image, performing uniform sampling on an external contour of the reference blood vessel, and obtaining a contour feature point set of the reference blood vessel according to the external contour information of the reference blood vessel, wherein the contour feature point set of the reference blood vessel includes a blood vessel external diameter at each point on the external contour of the reference blood vessel obtained in the extravascular image and a lateral vascular length from said each point to a proximal end of the reference blood vessel;

in the intravascular image, performing uniform sampling on a blood vessel intravascular image of a blood vessel segment of interest, and obtaining a contour feature point set of the blood vessel of interest according to the internal contour information of the blood vessel segment of interest, wherein the contour feature point set of the blood vessel of interest includes a blood vessel internal diameter and a medial vascular length at a blood vessel position point corresponding to each frame image in the intravascular image of the blood vessel segment of interest, wherein the medial vascular length at each blood vessel position point is a distance from said point to a starting point, and the starting point is an end point that is close to a proximal end of the blood vessel segment of interest and that is collected in the intravascular image; and obtaining the third feature information according to the contour feature point set of the reference blood vessel and the contour feature point set of the blood vessel of interest; and secondary registration step: performing a secondary registration on the first feature information and the third feature information to obtain a target registration result.

2. The method for registering an extravascular image with an intravascular image according to claim 1, wherein the obtaining the third feature information according to the contour feature point set of the reference blood vessel and the contour feature point set of the blood vessel of interest, comprises:

constructing a reference region according to the contour feature point set of the reference blood vessel, and constructing a sliding window according to the contour feature point set of the blood vessel of interest;

making the sliding window slide in the reference region, calculating and obtaining a matching degree between each region in the reference region and the sliding window based on the contour feature point set of the reference blood vessel, the contour feature point set of the blood vessel of interest, the external branch information of the reference blood vessel, and the internal branch information of the blood vessel segment of interest; and comparing the matching degrees to obtain the third feature information.

3. The method for registering an extravascular image with an intravascular image according to claim 2, wherein the external branch information of the reference blood vessel includes a serial number of each branch blood vessel of the reference blood vessel obtained in the extravascular image and a branch blood vessel external length from a bifurcation point of each branch blood vessel to the proximal end of the reference blood vessel; and the internal branch information of the blood vessel segment of interest includes a serial number of each branch blood vessel of the blood vessel segment of interest obtained from the intravascular image and a branch blood vessel internal length of each branch blood vessel from the starting point.

4. The method for registering an extravascular image with an intravascular image according to claim 3, wherein the method for calculating a matching degree between each region in the reference region and the sliding window comprises:

calculating a diameter matching score according to the blood vessel external diameter in the contour feature point set of the reference blood vessel and the blood vessel internal diameter in the contour feature point set of the blood vessel of interest;

calculating a branch matching score according to the external branch information of the reference blood vessel and the internal branch information of the blood vessel segment of interest; and constructing a matching function according to the diameter matching score and the branch matching score, and calculating the matching degree using the matching function.

5. The method for registering an extravascular image with an intravascular image according to claim 4, wherein the diameter matching score is shown as $$S_d = \frac{1}{N} \sum_{i=1}^{N} |d_{si} - d_{ti}|,$$

wherein $S_d$ indicates the diameter matching score, N indicates the total number of feature points in the sliding window; $d_{si}$ indicates the blood vessel internal diameter corresponding to the $i^{th}$ feature point in the sliding window, and $d_{ti}$ indicates the blood vessel external diameter corresponding to the $i^{th}$ feature point in the reference region.

6. The method for registering an extravascular image with an intravascular image according to claim 4, wherein the branch matching score is shown as $$S_b = \frac{1}{M} \sum_{i=1}^{M} dist_i,$$

wherein $S_b$ indicates the branch matching score, and M indicates the total number of branches in the sliding window; $dist_i$ indicates a distance between the $i^{th}$ branch blood vessel in the sliding window and a branch blood vessel closest to the branch blood vessel in the reference region.

7. The method for registering an extravascular image with an intravascular image according to claim 4, wherein the matching function is shown as $$S = \frac{1}{\beta S_d + (1 - \beta) S_b},$$

wherein S indicates the matching function, $S_d$ indicates the diameter matching score, $S_b$ indicates the branch matching score, β indicates a weighting factor, and 0<β<1.

8. The method for registering an extravascular image with an intravascular image according to claim 7, wherein β ranges from 0.3 to 0.7.

9. The method for registering an extravascular image with an intravascular image according to claim 7, wherein the target blood vessel segment is a blood vessel segment corresponding to a region having a highest matching degree with the sliding window in the reference region.

10. The method for registering an extravascular image with an intravascular image according to claim 2, wherein prior to constructing the reference region and the sliding window, the primary registration step further comprises:

performing uniform sampling on the external contour of the reference blood vessel in the extravascular image according to a distance between any two adjacent points in the contour feature point set of the blood vessel of interest.

11. The method for registering an extravascular image with an intravascular image according to claim 1, wherein, in the extravascular image, the performing uniform sampling on an external contour of the reference blood vessel, and obtaining a contour feature point set of the reference blood vessel according to the external contour information of the reference blood vessel, comprises:

performing uniform sampling on an external contour curve of the reference blood vessel in the extravascular image, where the external contour of the reference blood vessel is discretized into various points;

constructing external contour feature points for the points by taking the lateral vascular length from each point to the proximal end of the reference blood vessel as the first-dimensional feature, and taking the blood vessel external diameter of this point as the second-dimensional feature; and obtaining the contour feature point set of the reference blood vessel according to all the external contour feature points.

12. The method for registering an extravascular image with an intravascular image according to claim 1, wherein, in the intravascular image, the performing uniform sampling on the blood vessel intravascular image of the blood vessel segment of interest, and obtaining a contour feature point set of the blood vessel of interest according to the internal contour information of the blood vessel segment of interest, comprises:

detecting the intravascular image at each frame in a sequence image of the intravascular image as a detection point;

constructing an internal contour feature point of each frame image by taking the medial vascular length between the blood vessel position point corresponding to each frame image and the starting point as the first-dimensional feature, and taking the blood vessel internal diameter of the blood vessel position point as the second-dimensional feature; and obtaining the contour feature point set of the blood vessel of interest according to all the internal contour feature points.

13. The method for registering an extravascular image with an intravascular image according to claim 1, wherein the primary registration step further comprises:

according to the third feature information, determining a blood vessel external diameter and a lateral vascular length corresponding to each point on an external contour curve of the target blood vessel segment in the extravascular image, and determining external branch information of the target blood vessel segment;

constructing an external contour feature point corresponding to each point on the target blood vessel segment by taking the lateral vascular length as the first-dimensional feature, and taking the blood vessel external diameter as the second-dimensional feature; and obtaining the contour feature point set of the target blood vessel according to all the external contour feature points.

14. The method for registering an extravascular image with an intravascular image according to claim 13, wherein the target registration result is a target registration relationship between the contour feature point set of the blood vessel of interest and the contour feature point set of the target blood vessel.

15. The method for registering an extravascular image with an intravascular image according to claim 14, wherein the secondary registration step comprises the following steps performed in sequence:

a) performing normalization processing on the contour feature point set S of the blood vessel of interest and the contour feature point set T of the target blood vessel respectively, to obtain a normalized contour feature point set S' of the blood vessel of interest and a normalized contour feature point set T' of the target blood vessel;

b) calculating a feature error between the normalized contour feature point set S' of the blood vessel of interest and the normalized contour feature point set T' of the target blood vessel;

c) determining whether the feature error is less than a preset value, and if yes, determining the normalized contour feature point set S' of the blood vessel of interest as target feature information, and calculating the target registration relationship according to the target feature information and the normalized contour feature point set T' of the target blood vessel; otherwise, performing the following step;

d) calculating a registration transforming relationship between the normalized contour feature point set S' of the blood vessel of interest and the normalized contour feature point set T' of the target blood vessel, and obtaining, by using the registration transforming relationship, a new contour feature point set S" of the blood vessel of interest upon registration transformation of the normalized contour feature point set S' of the blood vessel of interest; and e) replacing the contour feature point set S' of the blood vessel of interest with a new contour feature point set S" of the blood vessel of interest, and returning to step b).

16. The method for registering an extravascular image with an intravascular image according to claim 15, after step c) but prior to step d), further comprising:

when the feature error is more than or equal to the preset value, determining whether a number of iteration times is more than a preset number, and if yes, determining the contour feature point set S' of the blood vessel of interest as the target feature information, and calculating the target registration relationship according to the target feature information and the normalized contour feature point set T' of the target blood vessel; otherwise, increasing the number of iteration times by one, and performing the next step.

17. The method for registering an extravascular image with an intravascular image according to claim 16, prior to step b), further comprising: setting the number of iteration times to zero.

18. A non-transitory storage medium, which stores a plurality of instructions for a processor to load and execute the method for registering an extravascular image with an intravascular image according to claim 1.

19. The method for registering an extravascular image with an intravascular image according to claim 1, further comprising: generating, using the target registration result, a co-registered image that fuses the extravascular image and the intravascular image.

20. The method for registering an extravascular image with an intravascular image according to claim 1, wherein the intravascular image is obtained by OCT or IVUS.

21. An apparatus for registering an extravascular image with an intravascular image, comprising:

a first obtaining module, configured to obtain a first feature information of a blood vessel segment of interest in the intravascular image, wherein the first feature information includes internal contour information and internal branch information of the blood vessel segment of interest, wherein the first feature information is obtained based on a segmentation of a lumen boundary in a plurality of intravascular image frames for computation of the internal contour information and a detection of branch locations in the plurality of intravascular image frames for the internal branch information;

a second obtaining module, configured to obtain a second feature information of a reference blood vessel in the extravascular image, wherein the reference blood vessel is an entire blood vessel in which the blood vessel segment of interest is located, and the second feature information includes external contour information and external branch information of the reference blood vessel;

a primary registration module, configured to perform a primary registration on the first feature information and the second feature information to obtain a third feature information, wherein the third feature information includes external contour information and external branch information of a target blood vessel segment that is in the extravascular image and corresponding to the blood vessel segment of interest, wherein the primary registration comprises:

in the extravascular image, performing uniform sampling on an external contour of the reference blood vessel, and obtaining a contour feature point set of the reference blood vessel according to the external contour information of the reference blood vessel, wherein the contour feature point set of the reference blood vessel includes a blood vessel external diameter at each point on the external contour of the reference blood vessel obtained in the extravascular image and a lateral vascular length from said each point to a proximal end of the reference blood vessel;

in the intravascular image, performing uniform sampling on a blood vessel intravascular image of a blood vessel segment of interest, and obtaining a contour feature point set of the blood vessel of interest according to the internal contour information of the blood vessel segment of interest, wherein the contour feature point set of the blood vessel of interest includes a blood vessel internal diameter and a medial vascular length at a blood vessel position point corresponding to each frame image in the intravascular image of the blood vessel segment of interest, wherein the medial vascular length at each blood vessel position point is a distance from said point to a starting point, and the starting point is an end point that is close to a proximal end of the blood vessel segment of interest and that is collected in the intravascular image; and obtaining the third feature information according to the contour feature point set of the reference blood vessel and the contour feature point set of the blood vessel of interest; and a secondary registration module, configured to perform a secondary registration on the first feature information and the third feature information to obtain a target registration result.

*    *    *    *    *